US010127746B2

(12) United States Patent
Bergdale et al.

(10) Patent No.: US 10,127,746 B2
(45) Date of Patent: *Nov. 13, 2018

(54) SYSTEMS AND METHODS FOR ELECTRONIC TICKET VALIDATION USING PROXIMITY DETECTION FOR TWO OR MORE TICKETS

(71) Applicant: Bytemark, Inc., New York, NY (US)

(72) Inventors: Micah Bergdale, New York, NY (US); Nicholas Ihm, New York, NY (US); Gregory Valyer, Park Ridge, IL (US)

(73) Assignee: Bytemark, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/751,570

(22) Filed: Jun. 26, 2015

(65) Prior Publication Data
US 2015/0294515 A1    Oct. 15, 2015

Related U.S. Application Data

(63) Continuation-in-part of application No. 14/638,411, filed on Mar. 4, 2015, which is a continuation of
(Continued)

(51) Int. Cl.
*G07C 9/00* (2006.01)
*H04W 4/021* (2018.01)
(Continued)

(52) U.S. Cl.
CPC ........ *G07C 9/00111* (2013.01); *G06Q 20/045* (2013.01); *G06Q 20/3224* (2013.01);
(Continued)

(58) Field of Classification Search
CPC ................ G07B 15/00; G07C 9/00103; G07C 9/00111; G07C 9/00119; G07C 9/02; H04W 4/008; H04W 4/021
See application file for complete search history.

(56) References Cited

U.S. PATENT DOCUMENTS 8,379,874 B1 * 2/2013 Simon ................... H04R 27/00
381/1
2002/0010603 A1    1/2002 Doi
(Continued)

*Primary Examiner* — Mohamed Barakat
(74) *Attorney, Agent, or Firm* — Jennifer Meredith, Esq.; Meredith & Keyhani, PLLC

(57) ABSTRACT

A system for monitoring two or more persons in an area with an entry point having an access allowed indication or an access denied indication. a token device in communication with at least one wireless proximity detection device which determines a relative location of the token device to provide a detection data point for each of the wireless proximity detection devices and a set of detection data points for the group of detection data points; a system computing device which calculates the shared proximity of the token device according to the set of detection data points and determines that the token device contains at least two valid tickets or does not, if there are valid tickets and the shared proximity of the token device is within a predetermined area the access allowed indication will display to allow entry for a number of persons corresponding to the number of the tickets.

35 Claims, 31 Drawing Sheets

Related U.S. Application Data application No. 14/496,645, filed on Jun. 25, 2014, which is a continuation-in-part of application No. 13/901,243, filed on May 23, 2013, now Pat. No. 9,239,993, application No. 14/751,570, which is a continuation of application No. 14/538,008, filed on Nov. 11, 2014.

(60) Provisional application No. 61/948,187, filed on Mar. 5, 2014, provisional application No. 61/883,097, filed on Sep. 26, 2013, provisional application No. 61/902,469, filed on Nov. 11, 2013.

(51) Int. Cl.
*H04W 4/80* (2018.01)
*G06Q 20/04* (2012.01)
*G06Q 20/32* (2012.01)
*G07B 15/00* (2011.01)
*G07C 9/02* (2006.01)

(52) U.S. Cl.
CPC ........ *G07C 9/00103* (2013.01); *H04W 4/021* (2013.01); *H04W 4/80* (2018.02); *G07B 15/00* (2013.01); *G07C 9/02* (2013.01)

(56) References Cited

U.S. PATENT DOCUMENTS

| | | | |
|---|---|---|---|
| 2002/0090930 A1* | 7/2002 | Fujiwara | G07C 9/00111 455/410 |
| 2002/0126780 A1* | 9/2002 | Oshima | G06Q 20/045 375/347 |
| 2004/0039635 A1* | 2/2004 | Linde | G06Q 20/04 705/14.26 |
| 2005/0116030 A1* | 6/2005 | Wada | G06Q 20/045 235/382 |
| 2005/0204140 A1 | 9/2005 | Maruyama | |
| 2005/0252964 A1 | 11/2005 | Takaki | |
| 2007/0215687 A1 | 9/2007 | Waltman | |
| 2007/0273514 A1* | 11/2007 | Winand | B64F 1/366 340/572.1 |
| 2007/0276944 A1 | 11/2007 | Samovar | |
| 2008/0191009 A1* | 8/2008 | Gressel | G06Q 10/02 235/382 |
| 2009/0055288 A1 | 2/2009 | Nassimi | |
| 2009/0088077 A1* | 4/2009 | Brown | H04B 5/02 455/41.2 |
| 2010/0044444 A1 | 2/2010 | Jain | |
| 2010/0228576 A1* | 9/2010 | Marti | G06Q 10/02 705/5 |
| 2010/0274691 A1 | 10/2010 | Hammad | |
| 2013/0103200 A1 | 4/2013 | Tucker | |
| 2014/0039945 A1* | 2/2014 | Coady | G06Q 10/02 705/5 |

* cited by examiner

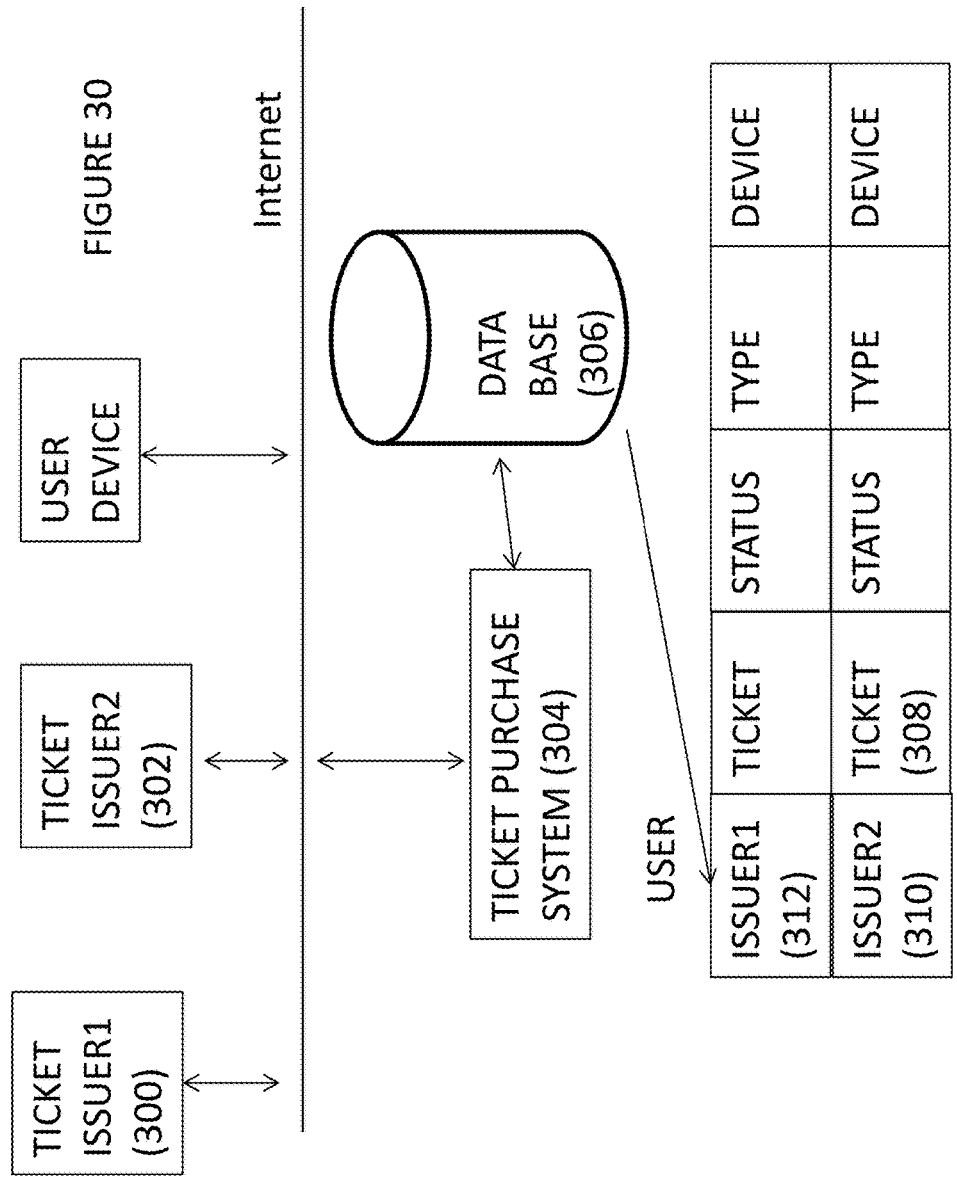

SYSTEMS AND METHODS FOR ELECTRONIC TICKET VALIDATION USING PROXIMITY DETECTION FOR TWO OR MORE TICKETS

This application claims priority to, as a continuation-in-part, co-pending patent application 14/638,411 filed Mar. 4, 2015 entitled, "Systems and Methods for Electronic Ticket Validation Using Proximity Detection" which claims priority to provisional patent application number 61/948,187 filed Mar. 5, 2014 and is a continuation of application 14/496,645 filed Sep. 25, 2014 which claims priority to application 61/883,097 filed Sep. 26, 2013 and is a continuation-in-part of application 13/901,243 filed May 23, 2013 and claims priority to and is a continuation of co-pending application 14/538,008 filed Nov. 11, 2014 which claims priority to provisional application 61/902,469 filed Nov. 11, 2013. The contents of each of the above referenced applications are incorporated by reference herein.

FIELD OF INVENTION

The present invention provides systems and methods for monitoring permission to be in an area. For example a concert, or mass transit in which a mechanical gate is used to allow or deny entry into an area. The present invention allows for electronic distribution of a ticket and utilizes sensors to locate the position of a token device that may have a token on it and determines if there is at least two valid tickets. If the token device contains valid tickets and the computing device determines the shared proximity of the token device is within a predetermined area the computing device will cause the mechanical gate to go to the open position (or display an access allowed indication) and allow entry for a number of persons corresponding to the number of at least two valid tickets.

BACKGROUND OF THE INVENTION

Venues such as theaters, amusement parks and other facilities that use tickets, for example airlines, ferries and other transportation have a need to use electronic ticketing. Existing systems distribute information that can constitute a ticket, but the verification problem is difficult. In one example of prior art, an electronic ticket is displayed as a bar-code on the recipient's telephone display screen. The telephone is then placed on a scanner that reads the bar-code in order to verify the ticket. The problem with these systems is that the scanning process is fraught with error and the time taken to verify the electronic ticket far exceeds that of the old system: looking at the paper ticket and tearing it in half. Barcode scanners were not designed to read a lit LCD screen displaying a bar code. The reflectivity of the screen can defeat the scanning process. Therefore, there is a need for an electronic ticketing system that provides an automatic verification and utilizes a token device. A token device may be a mobile phone, smartphone, computing device, luggage tag, lanyard, card, physical ticket, shipping label with barcode, NFC, RFID, UDID, Bluetooth ID. The term computing device may be, for example, an iPad®, iPhone®, tablet, smartphone, laptop or any device that is used for computing purposes.

SUMMARY OF THE INVENTION

Aspects of the invention provide for easy ticketing and security for an enclosed area.

One aspect of the present invention provides a system for monitoring permission for at least two persons to be in a location, the system comprising: a secured area having at least one entry point, wherein each of the entry points have a mechanical gate with an open position and a closed position; at least one wireless proximity detection device in at least one of a portion of the mechanical gate and an area adjacent to a portion of the mechanical gate; a token device in communication with the at least one wireless proximity detection device, wherein each of the at least one wireless proximity detection devices determine a location of the token device relative to at least one of the at least one wireless proximity detection devices to provide a detection data point for each of the at least one wireless proximity detection devices and a set of detection data points for the group of detection data points; a system computing device in communication with the at least one wireless proximity detection devices, wherein the system computing device calculates the shared proximity of the token device according to the set of detection data points and determines that the token device contains at least two valid tickets or does not contain a valid ticket, wherein the token device contains at least two valid tickets and the system computing device determines the shared proximity of the token device is within a predetermined area the system computing device will cause the mechanical gate to go to the open position to allow entry for a number of persons corresponding to the number of at least two valid tickets.

Another aspect of the present invention provides a system for monitoring permission for at least two persons to be in a location, the system comprising: a secured area having at least one entry point, wherein each of the entry points have an access allowed indication or an access denied indication; at least one wireless proximity detection device in at least one of a portion of the entry point and an area adjacent to the entry point; a token device in communication with the at least one wireless proximity detection device, wherein each of the at least one wireless proximity detection devices determine a location of the token device relative to at least one of the at least one wireless proximity detection devices to provide a detection data point for each of the at least one wireless proximity detection devices and a set of detection data points for the group of detection data points; a system computing device in communication with the at least one wireless proximity detection devices, wherein the system computing device calculates the shared proximity of the token device according to the set of detection data points and determines that the token device contains at least two valid tickets or does not contain a valid ticket, wherein the token device contains at least two valid tickets and the system computing device determines the shared proximity of the token device is within a predetermined area the system computing device will cause the access allowed indication to display to allow entry for a number of persons corresponding to the number of the at least two valid tickets.

The summary of the invention is not intended to be taken in a limiting sense and is intended to merely provide a brief summary of the invention.

BRIEF DESCRIPTION OF THE DRAWINGS

FIG. 30 depicts a flowchart for ticket issuance and validation.

DETAILED DESCRIPTION OF THE INVENTION

Electronic devices such as mobile phones, smartphones and the like are carried by users everywhere. Such devices are becoming more and more an essential part of consumer's everyday life and are carried with users everywhere. The present invention utilizes these devices to allow for entry into secured areas.

Conventional electronic tickets display a barcode or QR code on a user's device. The device is typically a mobile phone with a display screen. The problem with this approach is that a barcode scanner has to be used by the ticket taker. Barcode scanners are not highly compatible with LCD screen displays of barcodes. The amount of time that it takes to process an electronic ticket is greater than that of a paper ticket. Sometimes the LCD display does not scan at all and a passenger (or ticket holder) has to be sent away to get a paper printout of a ticket. Given the potential large crows that often attend open venues, this is impractical.

Figure 2:
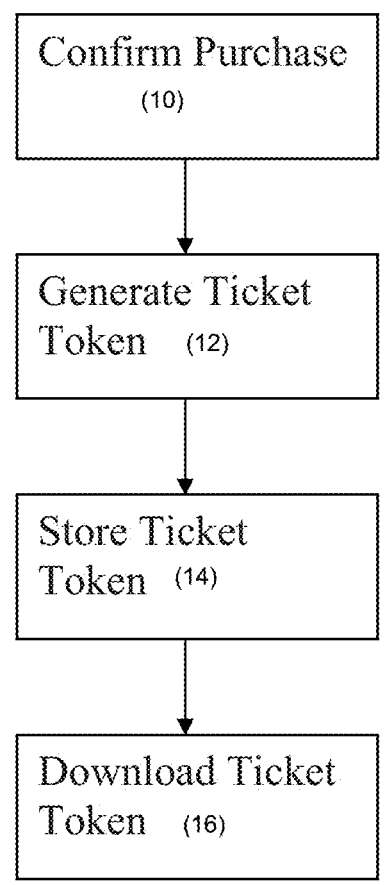
FIGS. 2 depicts a flow chart for ticket purchases according to aspects of the present invention.
Figure 3:
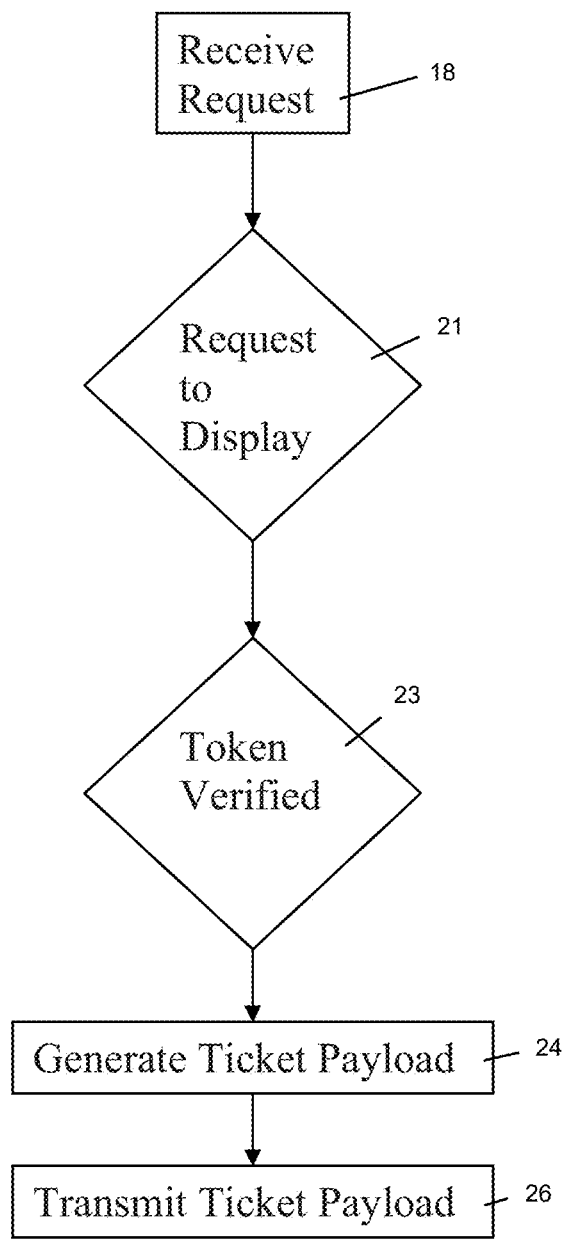
FIG. 3 depicts a flowchart for displaying a verifying visual object according to aspects of the present invention.

FIG. 2 depicts the process of a ticket token being downloaded. The user purchases a ticket from an online website (Confirm purchase (10)). The website sends to the user's device a unique number referred to as a token (Generate ticket token (12)). The unique number of the token may be a mixture of characters, alphanumeric and otherwise. This is to say that it may contain characters and letters in a string with numbers. The user's device becomes a "token device" as it is acting as the carrier for the token. The token is also stored in the ticketing database (Store ticket token (14)). There may be a token for each of the valid tickets. Also, there may be a single token for at least two tickets. For example, a single alphanumeric string may correspond to authorization to issue 1 adult and 1 child ticket. When the time comes to present the ticket(s), the token device may have an application that launches a user interface. The user can select "validate" or some other equivalent command to cause the application to fetch and download from the ticketing system a data object referred to herein as a ticket payload, which includes program to run on the token device (Download ticket token (16)). FIG. 3 depicts an example of this process. A request is received (receive request (18), there is a request to display (21), the token verified (23), a ticket payload generated (generate ticket payload (24)) and the ticket payload transmitted (transmit ticket payload (26)). In another embodiment, the ticket payload can be pushed to the token device by the venue. As a result, the application transmitted to the token device is previously unknown to the user of the token device and not resident in the token device. At that point the token device can execute the program embodied in the ticket payload, which causes the tickets to be validated and available on the token device for use.

Piracy is limited in several ways. First, the ticket holder and their device do not have access to the tickets until a time selected to be close to the point in time where the tickets have to be presented. Second, the ticket payload may contain code that destroys the tickets (or the token or object) a pre-determined time after the initial display or upon some pre-determined input event. Third, a number of security protocols can be utilized to ensure that a copy of the application that executes the tickets and make them available for use cannot be readily copied or reverse engineered.

The present invention also envisions that there may be different types of tickets. For example, there may be Child ticket, Senior ticket, VIP ticket, Military, Student or some other pre-designated category of user with a special ticket or privileges. As part of the ticket issuance process, there may be a verification process to ensure that the ticketing type actually matches up with the tickets that should be allowed for that end user. If tickets are purchased by a user and a ticket has a special attribute associated with the ticket, the data record associated with the user is updated to include the status. For example, the user data record can be updated to include a "SENIOR" flag. The user account is authenticated to allow for a certain type of discounted or other special ticketing. This can happen by means of submitting an ID string and the ID being validated to the registered user and the registered user device. Using whatever verification is appropriate results in the user data record being updated so that a logic flag or data value is indicated and associated with the ticketing type. The user account is associated with a specific mobile device. Following along the same process that is described below where a third party can manage a ticket and funds distribution to a mobile device, a mobile device can be locked to a user account for the purposes of receiving special ticket types, special deals, discounts, etc. that would only apply to that end user. The applicability of this could go much further too. By locking user devices to a user account and implementing a credential verification method, airlines could ensure that the mobile device being used for ticketing or club access or special discounts is the authorized user device for that user account and the ticket issued. Once the ticket(s) have issued, determining the identity of the user would not be necessary because the validation of the ticket alone would indicate that it has to be that person who is bringing up the ticket since only a specific device could bring up a ticket for that user account. In other words, the security of the ticket is at the level of the security of the user account. In that the user is determined to hold the right to the special privileges and then this data is stored with their account. In one embodiment, the system uses a third party account and device management component. In another embodiment, the ticket issuer can directly manage the user account and associated device(s) for the purposes of allowing specialized ticketing, access, and discount solutions to the user by that ticket issuer. This helps prevent leakage from a person distributing out tickets, access, and discounts to the non-intended user and does not require the person processing the discount or checking the ticket to have to look at an actual ID. For example, there may be a visual object that displays a notification that the ticket shows Military. If the visual object displays the Military notification, the device itself has been authorized to allow that user to bring up a Military discounted ticket. Further, other embodiments include determining a security or privilege status for the token device as well as its components, for example, RAM, ROM, swappable parts like SIM cards, USB sticks and other memory devices on which security tokens are stored and other secure data for the purpose of providing a secure platform, including memory integrated in the mobile device (token device).

Figure 1:
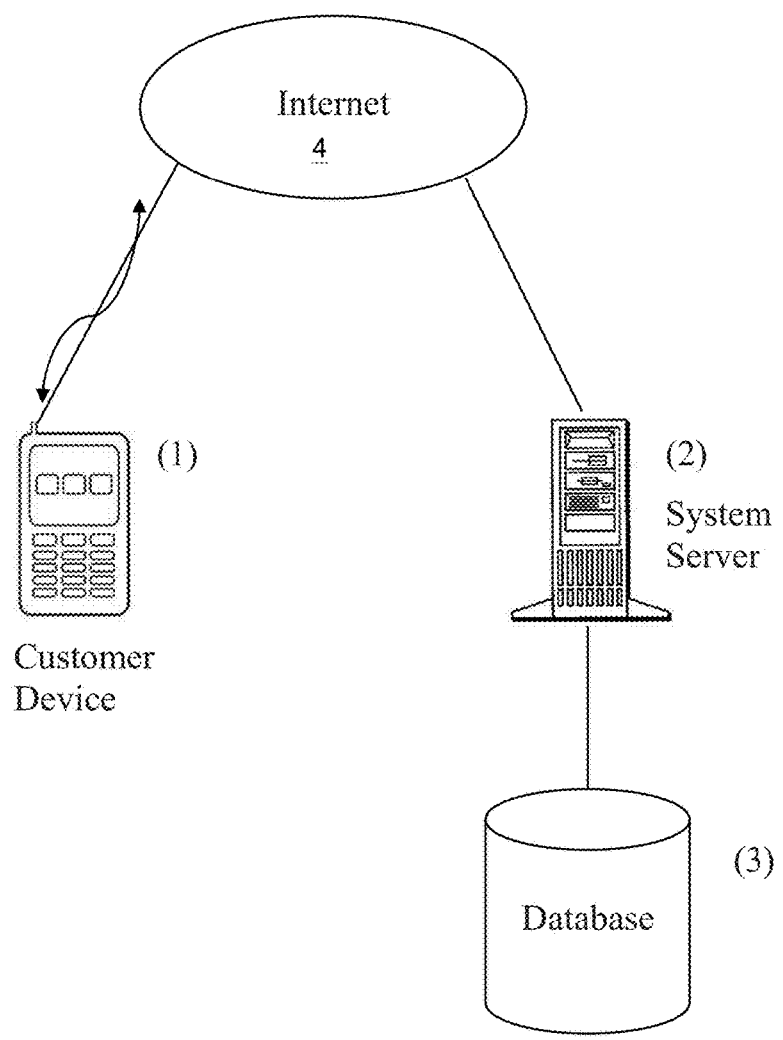
FIG. 1 depicts a basic architecture according to aspects of the present invention.
Figure 7:
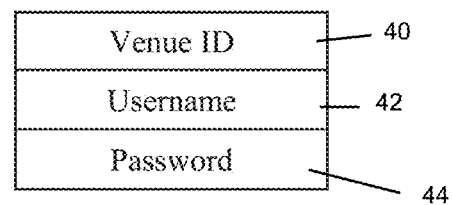
FIG. 7 depicts a schematic of an authorized user database record according to aspects of the present invention.

Referring to FIG. 1, the customer uses their token device (1) to purchase at least two tickets from the service operating the system server (2) and database (3). In one embodiment, an authorized user associated with the venue, for example a box office manager, logs into the back-end system through a secure web page. The authorized user can enter the web-page by entering a username, password and venue identifier. The system maintains a database (3) that associates the venue identifier (40) with a set of usernames (42) and password pairs (44) that are authorized to use the system on behalf of the venue. See FIG. 7. The system checks the database (3) to verify that the VenueID, username and password are consistent with each other. The authorized user can navigate through to a point in the system user interface where a particular show may be selected for ticket taking. The user selects the upcoming show, and then selects from a display of possible validating visual objects. The validating visual object is transmitted to a device which may be viewable by ticket taking staff at the entrances to the venue or automatically recognized. The staff may see the authorized object to accept for an upcoming show.

Ticket holds that have purchased tickets have data records in the system database that contains a unique token associated with the ticket and other relevant information, including venueID and an identifier identifying the specific show the ticket is for. See FIG. 6. At the entrance, customers may be requested to operate an application on their token device. This application fetches the stored ticket token and transmits that token to the system computing device, preferably over a secure data channel. The database looks up the token to check that the token is valid for the upcoming show. If the token is valid, then the system computing device may, optionally, transmits back to the token device a ticket payload. The ticket payload may contain computer code that, when operated, displays tickets or a selected validating visual object.

Figure 9:
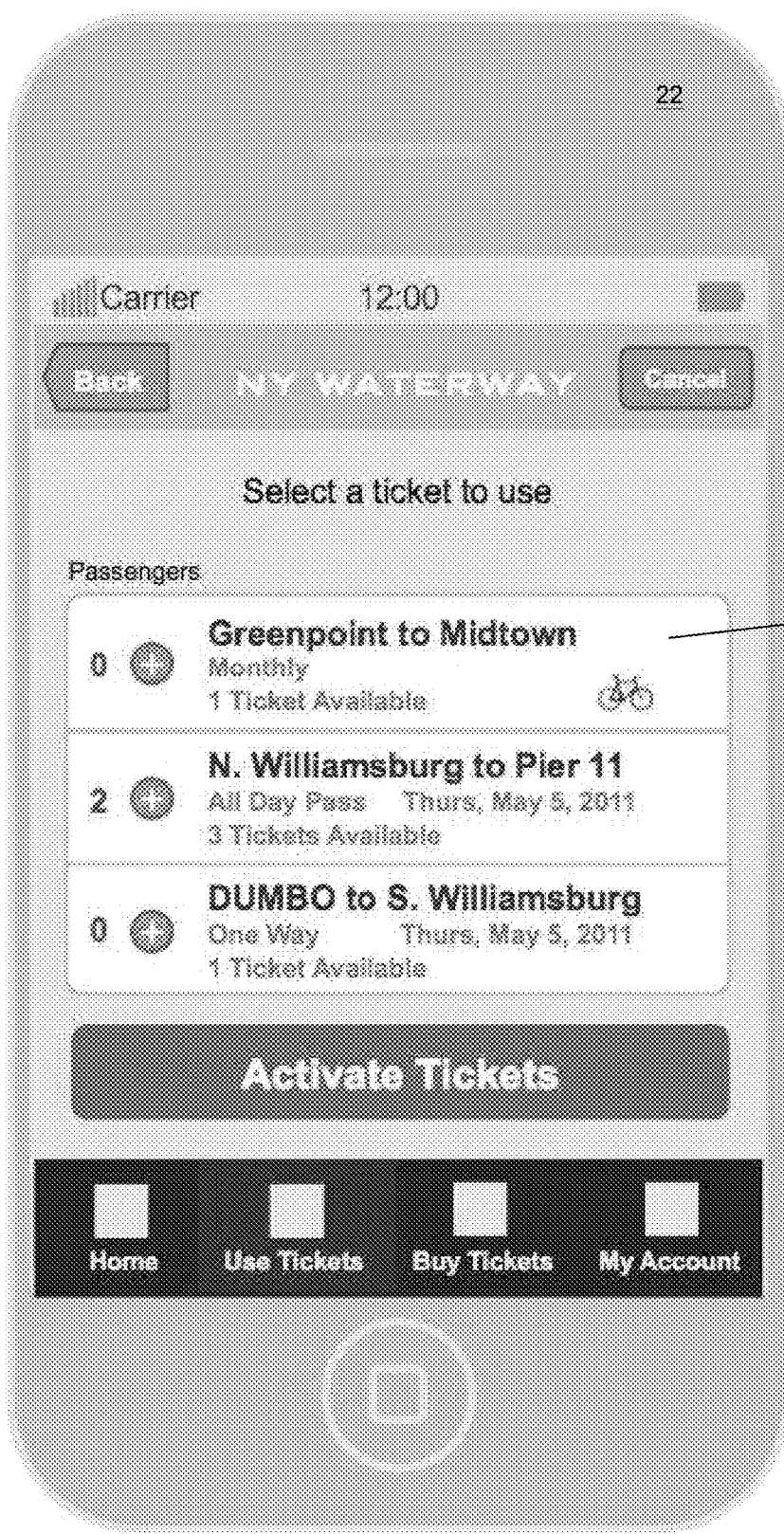
FIG. 9 depicts an example user interface on a user's device according to aspects of the present invention.
Figure 10:
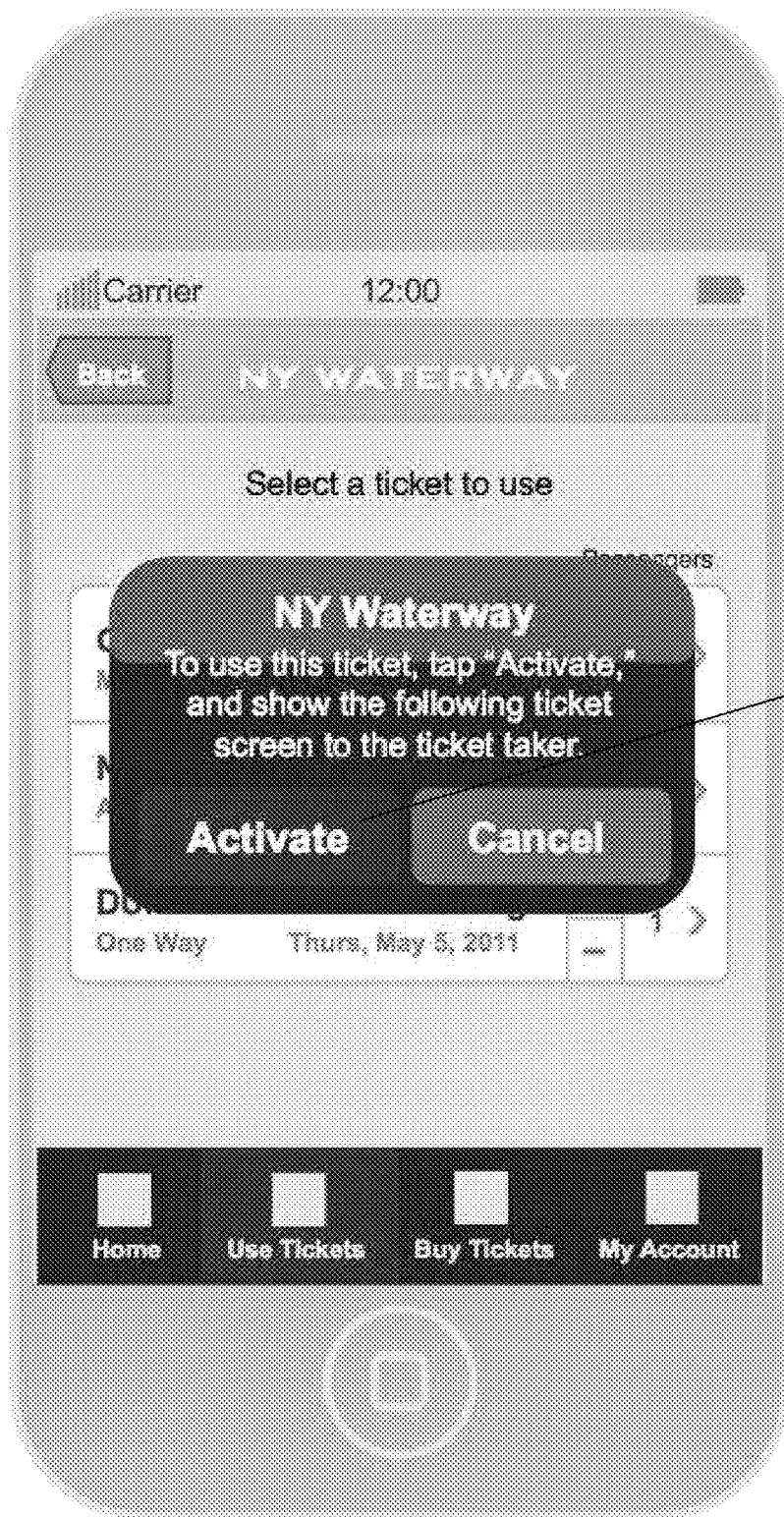
FIG. 10 depicts an example user interface showing an activation selection screen according to aspects of the present invention.
Figure 11:
FIG. 11 depicts an example user interface showing display of validating visual and other ticketing information according to aspects of the present invention.

The customer can navigate the user interface of the application in order to cause the application to request whether to display the validating visual object. As shown in FIG. 9, one or more available tickets (e.g. 20) can be displayed on the user interface, which provides that user the ability to select one of the tickets. When the customer properly actuates the user interface, for example, by actuating "Activate" button (see FIG. 10, item 62). The validating visual object (64) is displayed on the screen of the device. The animation can be presented along with other ticketing information (see FIG. 11). In one embodiment, the device transmits the ticket token to the system with a command indicating that a ticket has been used. In another embodiment, the customer can operate the application and request that the application transmit to the database the condition that the ticket was used. In that embodiment, the user can input a numeric code or password that the application uses to verify that the customer is confirming use of the ticket. In yet another embodiment, after the validating visual object has been launched, a predetermined amount of time later it can be deemed used. At that time, the application can cause the color of the object to be changes so that it indicates that there was a valid ticket, but the ticket was used. This condition may be useful in cases where the venue checks tickets during shows while letting customers move around the venue facilities. Another example, may be VIP seating, where customers are allowed in different areas of a venue once they gain entry into the large secured area.

Figure 8:
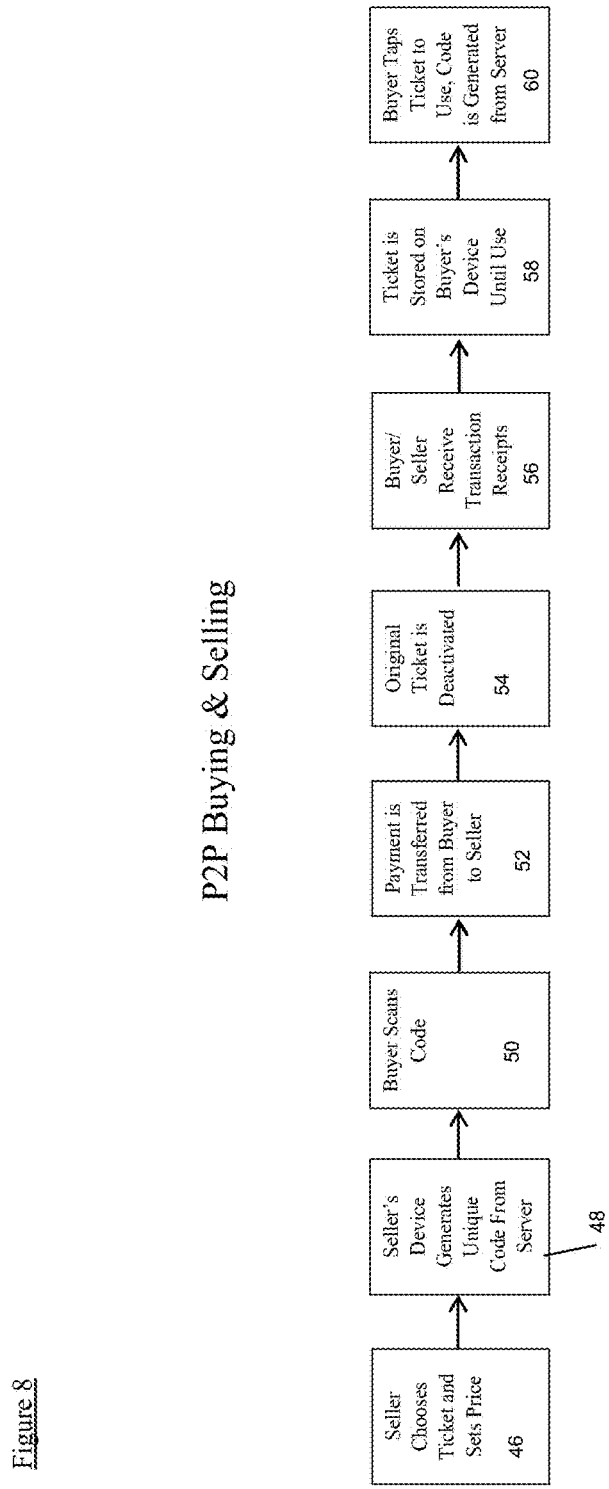
FIG. 8 depicts a flowchart for transfer of a ticket according to aspects of the present invention.

The use of electronic ticketing provides opportunities that change how tickets can be bought and sold. For example, a first customer can purchase a ticket and receive on their device a ticket token. A second customer can purchase that ticket using the system. The first customer can use the application to send a message to the system computing system (e.g. a server) indicating that the first customer intends sells the ticket. The system can ask the first customer for a username and password to be associated with the customer's ticket(s). If the second customer identifies the first customer's username, the system then can match the two together. At that point, the data record associated with the first customer's ticket is modified so that the ticket token value is changed to a new value. That new ticket token value is then transmitted to the second customer's device. At the same time, the system can operate a typical on-line payment and credit system that secures payment from the second customer and credits the first customer. In one embodiment, the system pays the first customer a discounted amount, retaining the balance as a fee. FIG. 8 depicts an example of Peer to Peer Buying and Selling. The seller chooses ticket and sets price (46), the seller's device generates a unique code from server (48), buyer scans code (50), payment is transferred from buyer to seller (52), original ticket is deactivated (54), buyer/ seller receive transaction receipts (56), ticket is stored on Buyer's device until use (58) and buyer taps ticket to use, code generated from server (60).

In yet another embodiment, the first customer may be unknown to the second customer. In that embodiment, the first customer simply may indicate to the system, through a message transmitted from the application operating on the device or directly through a web-page, that the first customer is not going to use the ticket and wishes to sell it. At that point, the system computing device can mark the data record associated with the ticket as "available for sale." When the second customer makes a request to purchase a ticket for the same show, the system creates a new ticket token for the second customer and updates the ticket token stored in the data record.

Figure 6:
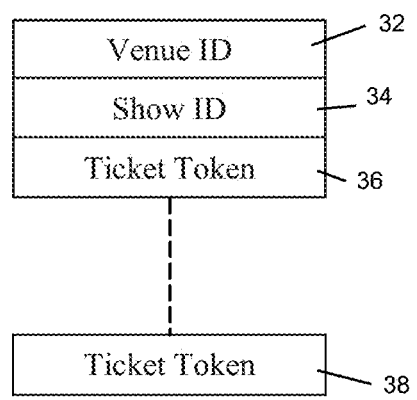
FIG. 6 depicts a schematic of an event database record according to aspects of the present invention.

In a general admission type of scenario, the ticketing database may include the following information: venueID, some identifier associated with the show itself, various time indicators, the selected validating visual object (optional) and a list of valid ticket tokens. In a reserved seating arrangement, the ticketing database has a data record associated with a show, as indicated by a show identifier, each seat has a data record that has a unique show identifier and ticket token, which includes the identity of the seat itself. FIG. 6 depicts an example of ticket token data (38), which may be made up of a venue ID (32), show ID (34) and a ticket token (36).

The present invention envisions extensive security measures. First, the ticket payload may be secured in a region of the device under the control of the telecommunications provider. In this case, the customer cannot access the code comprising the ticket payload. In another embodiment, the ticket payload may be encrypted in such a way that the only decrypting key available is in the secure portion of the telecommunications device. In that embodiment, the key is only delivered when an application running on the secure part of the device confirms that the ticket payload that is executing has not been tampered with, for example, by checking the checksum of its run-time image. At that point, the key can be delivered to the ticket payload process so that, for example, a validating visual object may be displayed on the device.

Another security measure may be to package selected animation for each token device. That is, the code that operates to display the validating visual object itself operates certain security protocols. The token device transmits a ticket transaction request. The request includes a numeric value unique to the device, for example, an IMEI number. Other embodiments use the UDID or hardware serial number of the device instead of or in combination with the IMEI number. The system computing device (also referred to as the system server) then generates the ticket token using the IMEI number and transmits that value to that device. In addition, the ticket payload is created such that it expects to read the correct IMEI number. This is accomplished by the system server changing portions of the ticket payload so that it is customized for each individual IMEI number associated with a ticket token. In the case of validating visual objects, there may be animation code as the ticket payload that is designed so that is has to obtain to correct IMEI number at run time. In another embodiment, at run-time, the animation code will read the particular ticket token specific for the phone that instance of the animation was transmitted to. The code will then decode the token and check that it reflects the correct IMEI number for that device.

In another embodiment, the security protocol first requires the user to login to the server with a login username and password. The application also transmits the IMEI, UDID or serial number of the device or any combination of them. When verified by the system computing device (server), an authorization key (Authkey) is transmitted to the device. The Authkey is a random number. If the user's application transmits a request for a validating visual object, it transmits the Authkey and the IMEI, UDID or serial number (or any combination of these) that is used for verification. This is checked by the server for validity in the database. On verification, the validating visual object is encrypted using Authkey and transmitted to the device. The application running on the device then uses the Authkey to decrypt and display the validating visual object. The Authkey may be a one-time key. It may be used once for each ticket payload. If a user buys a second ticket from the system, a different, second Authkey is unique to the ticket for a given event. In another embodiment, the Authkey is unique to the ticket, device and the event. According to another embodiment a single Authkey is used for at least two tickets that are going to be used together. For example, if a parent and child are attending an event and the parent will be carrying the token device for both individuals. In other embodiments, the Authkey can be replaced with a key-pair in an asymmetric encryption system. In that case, the validating visual object is encrypted with a "public" key and then each user is issued a private key as the "Authkey" to be used to decrypt the object.

In another embodiment, the Authkey can be encrypted on the server and transmitted to the device in the encrypted form. Only when the application is operating can the Authkey be decrypted with the appropriate key. In yet another embodiment, the application that displays the validating visual object can request a PIC number or some other login password from the user, such that if the device is lost, the tickets cannot be used by someone who finds the device.

In another embodiment, the application running on the device can fetch a dynamic script, meaning a piece of code that has instruction arranged in a different order for subsets of devices that request it. The ticket payload is then modified so as to have the same number of versions that are compatible with a corresponding variation in the dynamic script. As a result, it is difficult to reverse engineer the application because the application will be altered as run time and the ticket payload customized for that alteration. One embodiment of the dynamic script would be expressed in JAVA (tm) computer language and rendered using OpenView. The ticket payload may be an HTML file called using Ajax.

Security can also be enhanced by actively destroying the validating visual object so that it resides in the device for a limited time. In one embodiment, the ticket payload has a time to kill parameter that provides the application with a count-down time to destroy the validating visual object. In another embodiment, the validating visual object is displayed when the user holds down a literal or virtual button on the user interface of the token device. When the button is release, the application destroys the validating visual object.

Security can also be enhanced by retaining as steganographic data embedded in the validating visual object the IMEI, UDID, Serial number or phone number of the token device. The application can be operated to recover that information and display it on the screen. This makes it possible for security personnel at a venue to view that information from a validly operating device. If the device is showing a pirated validating visual object, then the actual data associated with the device will not match and it will be apparent from the inspection of the device. This way, suspicious ticket holds can be subject to increased scrutiny, the presence of which deters privacy.

In another embodiment, the ticket payload can operate a sound sampling application that requests the customer to speak into the token device. The application can then use that data to check whether the voice print of the speaker matches the expected voice print. The sound sampling may be an additional ticket validation, and the token device must indicate (or contain) a valid ticket, there must be the additional ticket validation (such as the sound sampling) and the system computing device must determine the shared proximity of the token device to be within a predetermined area for the mechanical gate to go to the open position and allow the carrier of the token device to enter a secured area. For the issuance of multiple tickets, it may only be necessary to require the additional ticket validation for a single ticket or user. In yet another embodiment, the device can take a picture of the customer's face and facial recognition code embedded in the ticket payload can operated to check whether the features of the face sufficiently match a pre-determined set of features, that is, of the customer's face at the time the ticket was purchased. Again, this may only be required for one user in the situation of multiple tickets. In yet another embodiment, the verification can be supplemented by being sure that the use of the ticket(s) is during a pre-determined period of time. In yet another embodiment, the verification can be supplemented by the ticket payload operating to check that the location of the venue where the tickets are being used is within a pre-determined range of tolerance to a GPS (Global Positing System) location. In yet another embodiment, after a certain pre-determined number of downloads of ticket payloads for a specific show, the validating visual object is automatically changed. This last mechanism may be used for promotions, to select the first set of ticket buyers for special treatment at the venue. In yet another embodiment, two different validating visual objects may be used, which are selected based on the verified age of the customer. In this way, a venue can use the system to not only verify ticket holders coming into the venue, but to verify their drinking age when the alcoholic drinks are ordered.

Figure 12:
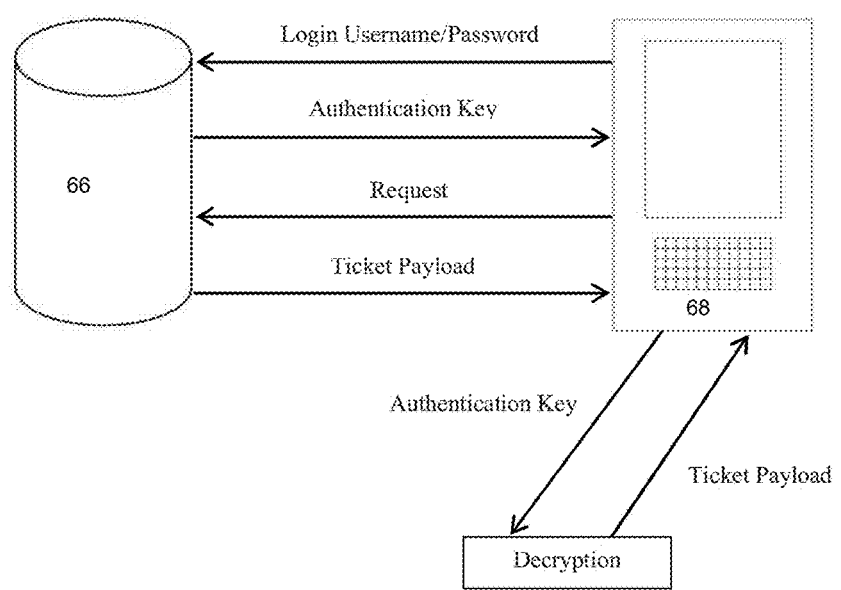
FIG. 12 depicts a ticket activation process according to aspects of the present invention.

In yet another embodiment, as depicted in FIG. 12, the system computing device (66) (also referred to as the system server) controls the ticket activation process. In this embodiment, the token may be generated randomly by the user's token device (68) and then transmitted to and stored on the system server (66) as a result of the user's request to activate the ticket(s). When the server receives a request to activate a ticket or tickets, the server checks whether there is already an activation token stored in its database that corresponds to that ticket. The token is stored in a data record associated with the user that is activating the ticket. The user logs into the account and then requests that a ticket be activated. If it is, then it checks whether the token received from the user's token device matches the stored token. That is, it authenticates against the stored token. The user's request for activation is the first activation of the ticket(s), then the server stored the received token into the data record associated with the user's account and keeps it there for a predetermined period of time, in order to lock the tickets to that device for that period of time. This process locks tickets to that unique token for that lock period. Typically this will lock the tickets to the user's mobile computing device. If the stored token does not match the token received from the user's computing device, the ticket activation is denied.

The predetermined lock time permits a reusable ticket to be locked to a device for the determined lock time. This is useful in the event the user changes the mobile computing device that the user uses to the ticket. For example, a monthly train commuting ticket would be activated once each day and would remain activated for the day of its activation. In this case, the user would validate the ticket once each day and that activation would be locked to the device for the day. The next day, the user would be able to activate the ticket using a different mobile computing device (also referred to more generally as a token device) if the predetermined time locking the activation has expired. That is, if the data record associated with the ticket has been automatically reset into a deactivated state. The activation process also permits a user account to be shared with a family, for instance, but that each ticket sold to that account may be locked to one token device. Also, more than one ticket may be locked to one token device.

Figure 13A:
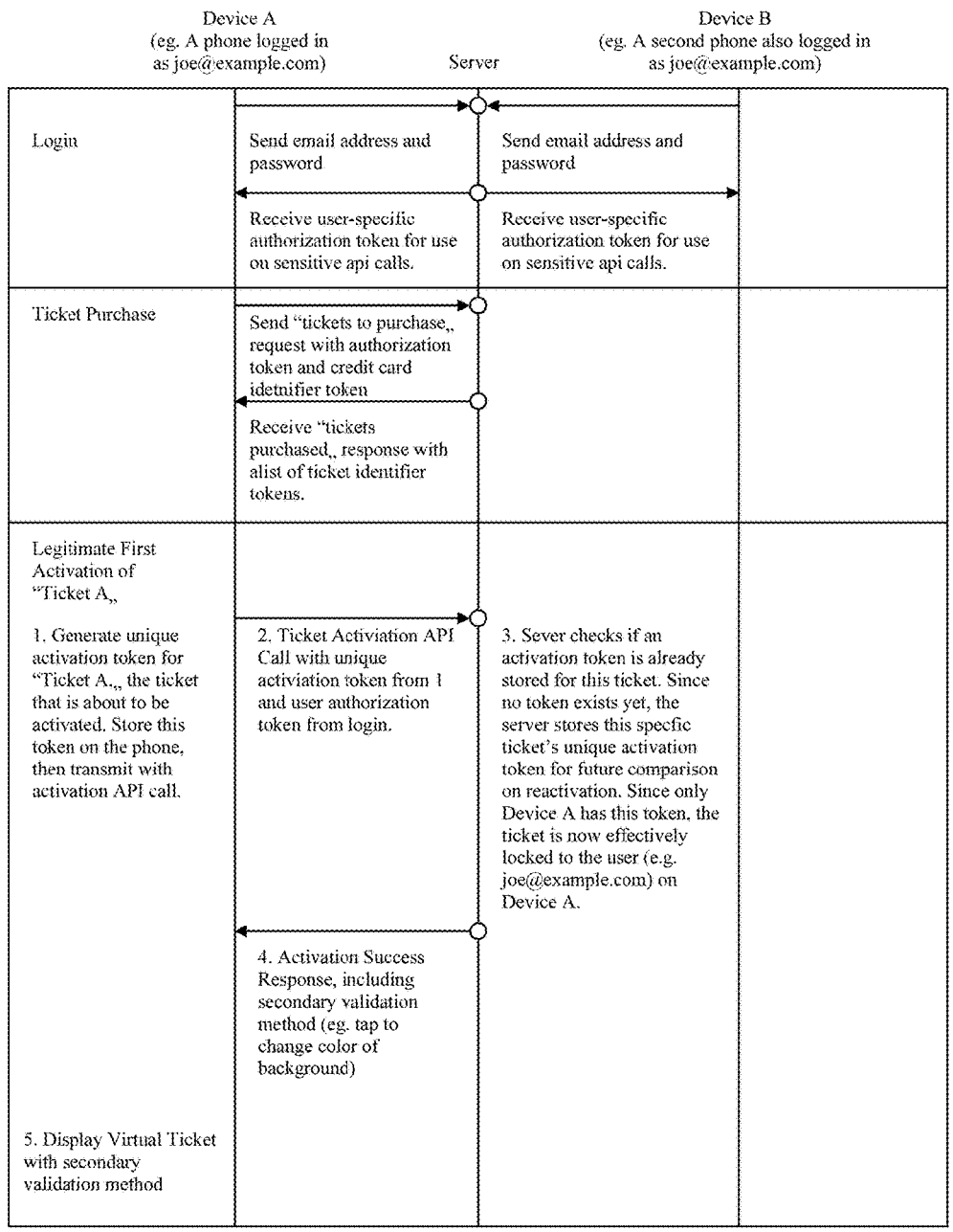
FIG. 13a is a protocol diagram for the activation process according to aspects of the present invention.
Figure 13B:
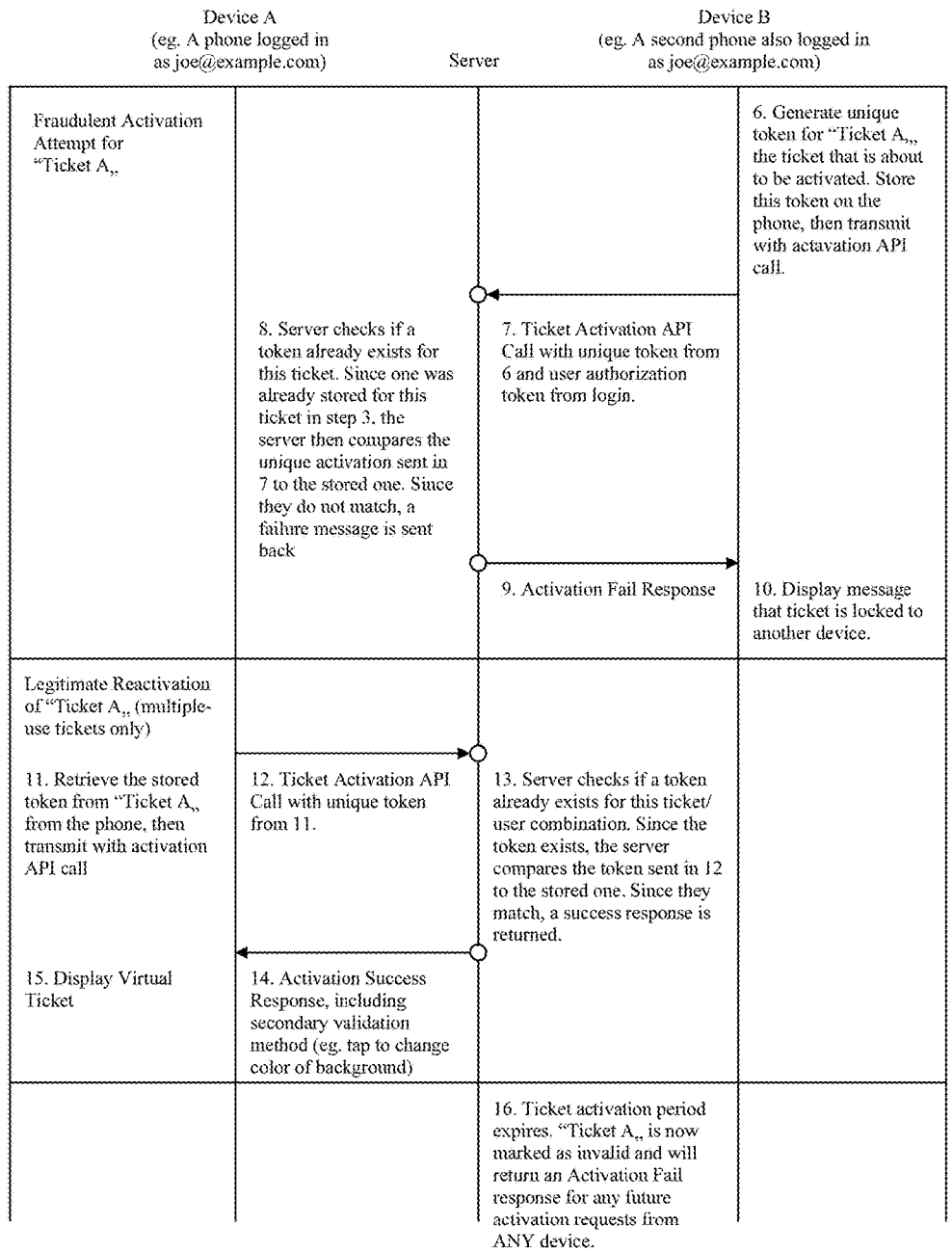
FIG. 13b is a continued protocol diagram for the activation process according to aspects of the present invention.

As depicted in FIGS. 13a and 13b, the user can use their token device to request that their tickets get activated for the first time. However, once that activation process has occurred, the server will store the unique token received from the activating user's computing device in the database in a manner that associates it with the tickets and the user's account. If another user associated with the account attempts to use the tickets by activating it, a different random token will be transmitted to the server. Because these two tokens do not match, the second activation will be prohibited.

The ability of a third party to manage, distribute, remove or authorize tickets, passes, funds or entry for a specific user device and/or user account combination are aspects of additional embodiments. In one embodiment, there are currently tools for user mobile device management for the purposes of managing the software that resides on a phone. There is also account management software that is used to associate tickets, passes and funds to a user's account. There may be multi-factor management that provides specific controls over the user account and device management which are combined for the management of tickets, passes and funds. In this embodiment, the management system can permit an authorize third party to manage the association of a user account with a device, or a ticket with a device. For example, if an employee that has employer sponsored tickets downloaded to their mobile device decides to replace the device with a new device, the employer can log into the system, bring up the portion of the user's account associated with the employer and then update the data record associated with the user that are related to the employer so that the existing purchased tickets become authorized for the new mobile device, while deactivated for the old device, to prevent the old device from being able to utilize ticketing functionality.

There may be a computer system comprised of a management account and a user account. The management account may be accessible by the ticket issuer. There may be many management accounts, given that the ticketing system may issue tickets for more than one location. In other words, there may be a management account for a sport venue and a management account for a subway system. The user accounts are associated with the user and the user's mobile device (or token device). When the user buys a ticket from a ticket issuer, the ticket issuer is provided the privilege of viewing and modifying the ticket data associated with the user's ticket from that ticket issuer. As a result of a user having a subway ticket and a sports venue ticket in their account, both the subway system and the venue have limited control of the user account portions associated with their respective tickets. Similarly, an employer that buys subway tickets for their employees may have limited control over the user's account portion associated with those purchased subway tickets. In other uses, the ticketing issuer can manage the transfer or sale of tickets from one user to another. In this scenario, the ticketing issuer has the authority to enter the management database and delete the ticket from the account of the transferor and input it into the account of the transferee. The transferee's device information is part of its account, so the new ticket is issued in accordance with the system requirements to bind that new ticket to the transferee's device.

There may be two ticket issuing entities that have computer systems that are operatively connected to the ticket management system. That system is comprised of a database, which is further comprised of a data record associated with the user. The user may have any number of tickets, but each ticket is associated with an issuer. A given ticket issuing entity can log into the ticket purchasing system and view all of the tickets it has issued or a subset based on a query, for example, all tickets for a particular event, or issued to a particular user of device. The ticker issue is authorized by the ticket management system to only have the authority to view its own tickets and specific information related to the ticket. The system will shield the user's other ticket data or private information from the ticket issuer as appropriate.

When the ticket issuer has finished modifying or managing the ticket entry, the ticket may then be issued to the user's device. Practitioners of ordinary skill will recognize that the embodiments of the database data records presented as a flat database file may also be equivalently expressed as a series of relational tables.

Figure 19:
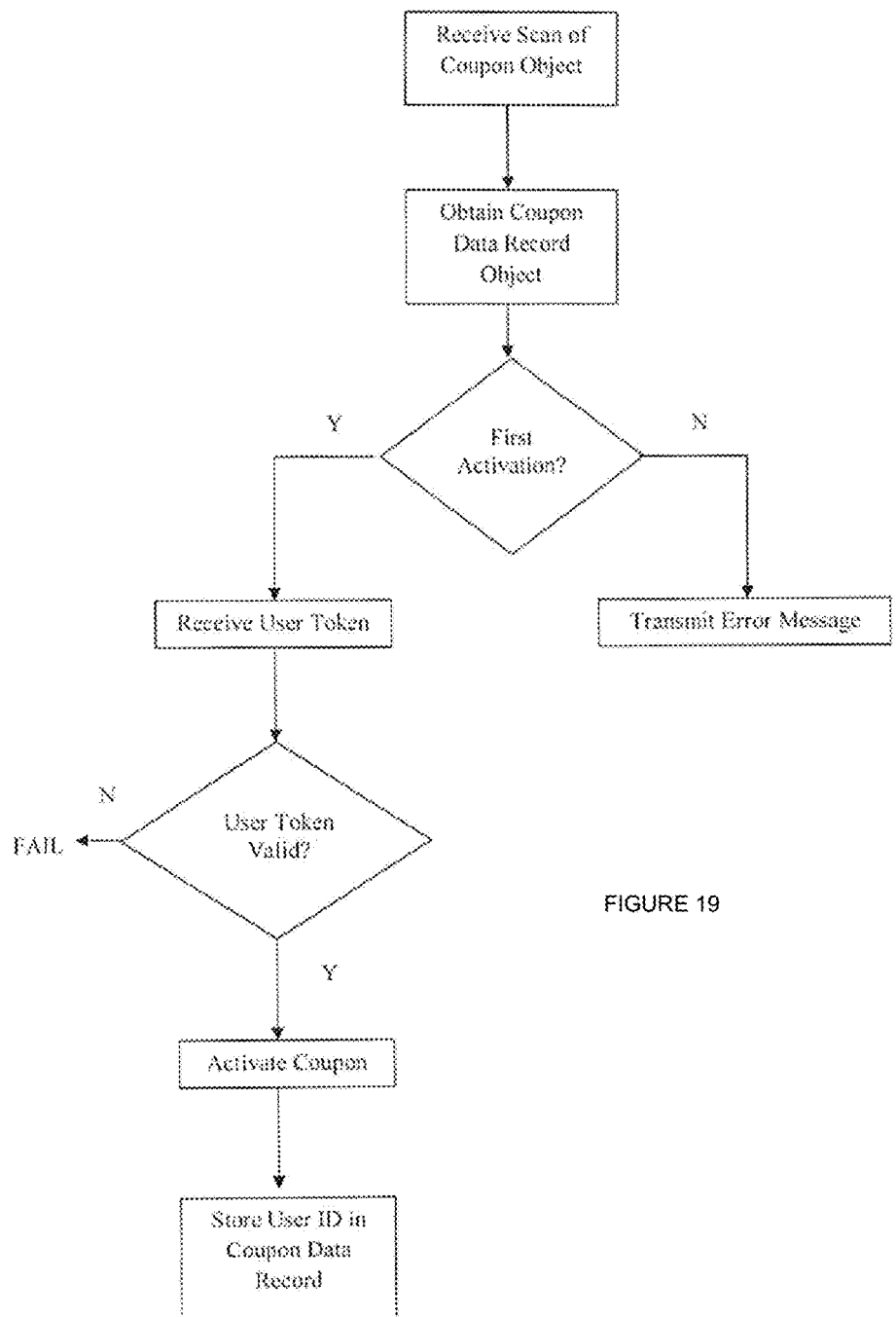
FIG. 19 depicts a flowchart according to aspects of the present invention.

The activation process can also permit a ticket to be shared. In this embodiment, the user who has activated the ticket can submit to the server a request that a ticket be transferred to another user. For example, a data message can be transmitted from the user's device to the system that embodies a request to move the ticket to another user. In that case, the stored token is marked as blocked, or is equivalently considered not present. This is accomplished by storing a data flag in the database that corresponds to the ticket. One logic state encodes normal use and the opposite logic state encodes that the ticket has been shared. A data message may be transmitted to the second user indicating that the ticket is available for activation. The second user may submit a request to activate the ticket and a random token value is transmitted from the second user's device to the server. That second token value is checked to see if it's the first activation. Because the first user has activated the ticket, but then transferred it, the activation by the second user is not blocked. That is, the server detects that the first token is now cancelled or equivalently, the system has returned to the state where the first activation has not occurred and therefore permits the new activation to take place. The new activation can also have a predetermined time to live value stored in the database that is associated with it. In this case, the activation by the second user expires and the second user can be prevented from reactivating the ticket. At the same time, the flag setting that disables the first token can be reset, thereby setting the ticket up for reactivation by the first user. By this mechanism, it is possible for the electronic ticket to be lent from one user to another. There may also be Coupon objects, as depicted in FIG. 19. As depicted, there may be the following steps: receive scan of coupon object (1900); obtain coupon data record object (1902); determine if this is a first action (1904); if no transmit error message (1906); if yes receive user token (1908); determine if the user token is valid (1910); if yes activate coupon 1912; and store UserID in Coupon Data Record (1914).

According to one embodiment, the ticket activation process can open a persistent connection channel over the data network that links the server and the user's mobile computing device. In this embodiment, if the activation of the tickets and therefore the device is successful, the server can maintain a persistent data channel with a computer process running on the user's computing device. In this embodiment, the request for ticket activation causes the user computer device (token device) to open the persistent channel. In this embodiment, the request for ticket activation causes the user computer device to open the persistent channel. The server establishes a communication process operating on the server that receives data and then causes that data to be automatically routed to the user's computing device. The process on the user's mobile computing device can thereby automatically respond to that received data. In tandem, the computer process operating on the user's computing device can send data directly to the server process associated with that user's session. For a server servicing many user devices, there may be one persistent channel established between the server and each mobile device that has an activated ticket.

The persistent channel between the server and the user's computer device can be used in a variety of ways. In one embodiment, the persistent connection is designed so that it maintains a bi-directional, full-duplex communications channel over a single TCP connection. The protocol provides a standardized way for the server to send content to the process operating on the user's computing device without being solicited by the user's device each time for that information and allowing for message to be passed back and forth while keeping the connection open. In this way a two-way (bi-directional) ongoing interaction can take place between a process operating on the user's computing device and the server. By means of the persistent channel, the server can control the activity of the user computing device. For each used computing device, there can be a distinct persistent connection.

Figure 14:
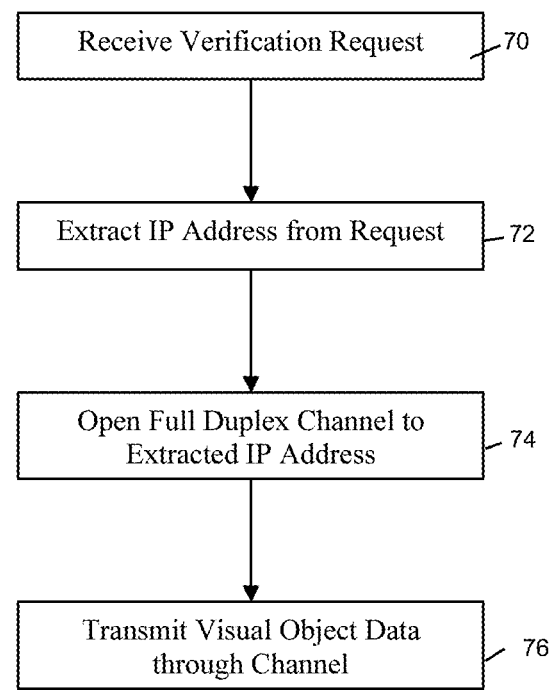
FIG. 14 depicts a flowchart for a persistent channel according to aspects of the present invention.

In one embodiment, as depicted in FIG. 14, the persistent connection is established when the user requests an activation of a ticket. There may be the following steps: receive verification request (70), extract IP address from request (72), open full duplex channel to extracted IP address (74) and transmit visual object data through channel (76). In other embodiments, the persistent connection can be used if the system is used to verify payment of a purchase price. In either case, the user computing device transmits a request message to the server. For each user computing device, there can be a distinct persistent channel. Each persistent channel has a label or channel name that can be used by the server to address the channel.

In the case of ticketing, when the ticket is activated the data representing the validating visual object can be transmitted in real time from the server to the user computing device and immediately displayed on the device. This provides an additional method of securing the visual ticketing process. In this case, when the ticket is activated and the persistent channel is created, the label of the channel is stored in the database in a data record associated with the user and the tickets. When the server transmits the validating visual object for the ticket(s), it fetches form the database the label of the channel and then uses that label to route the transmission of the validating visual object. The use of the persistent channel causes the user computer device to immediately and automatically act on the validating visual object.

The receipt of the validating visual object may cause the receiving process to immediately interpret the command and select and display the required visual patent. The process may also receive a block of code that the process call on to execute, and that code may cause the visual patent to be displayed. The process may receive images or video data and pass that data on to the user device screen display function for presentation on the user device screen.

A validating visual object may be transmitted to the user's computing device to be automatically displayed on the screen without the user having to input a command to cause the display. That visual object may be displayed by the user computing device. The server may transmit to the user computing device a visual object that contains the channel name or a unique number that the server can map to the channel name. For clarity, this additional visual object is not necessarily used for visual verification by ticket takers. The visual object may be used by machinery to confirm the ticket purchase transaction or even other transactions not directly related to the purchase of the ticket. The additional visual object may be in the form of a QR code, barcode or any other visual object that can be scanned, for example at a point of sale system, and from that scanned image, an embedded data payload extracted. In that visual object, data can be embedded that uniquely identifies the source of the scanned object. The channel name of the persistent channel or a number uniquely mapped on the server to identity the channel can be embedded in that scanned object.

Figure 15:
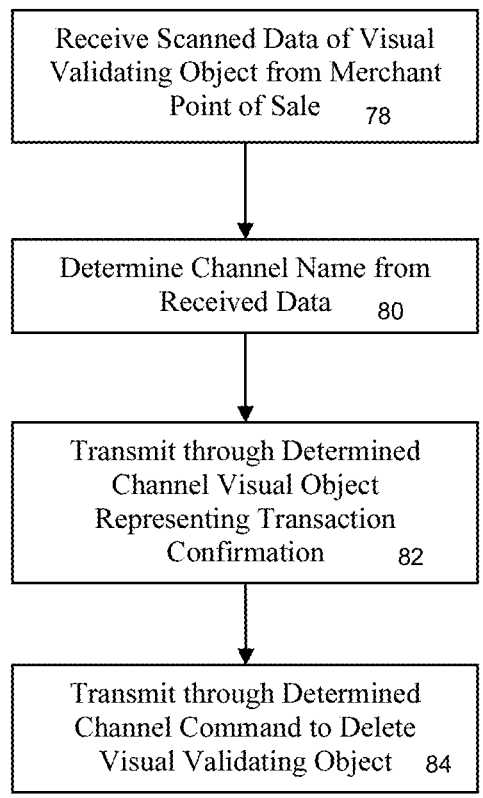
FIG. 15 depicts a flowchart for persistent channel for purchase verification according to aspects of the present invention.
Figure 20:
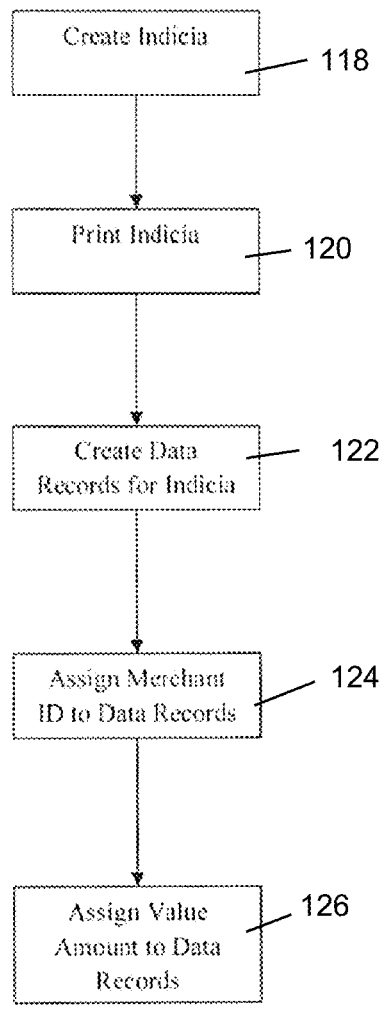
FIG. 20 depicts a flowchart according to aspects of the present invention.
Figure 21:
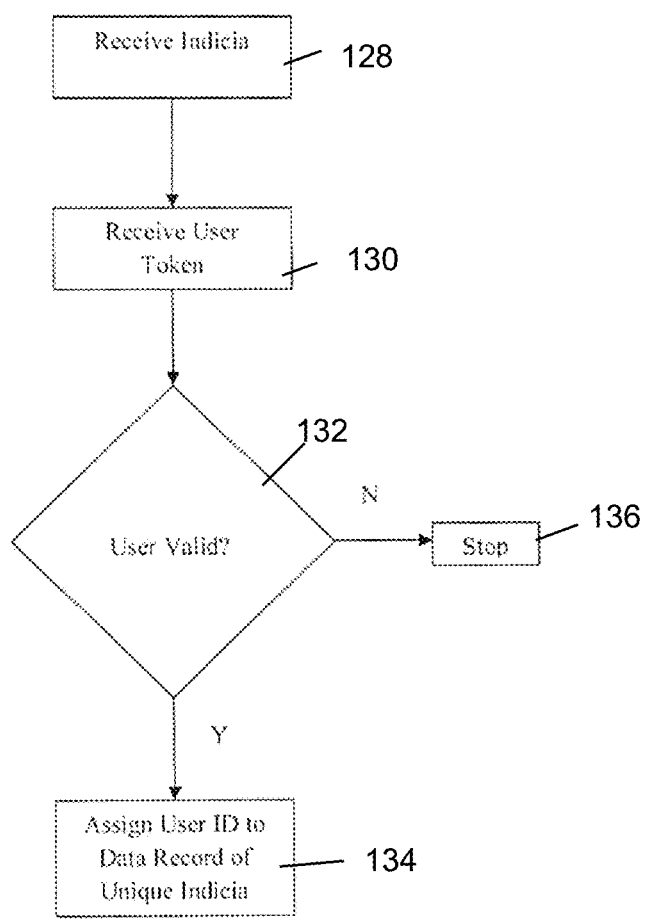
FIG. 21 depicts a flowchart according to aspects of the present invention.
Figure 22:
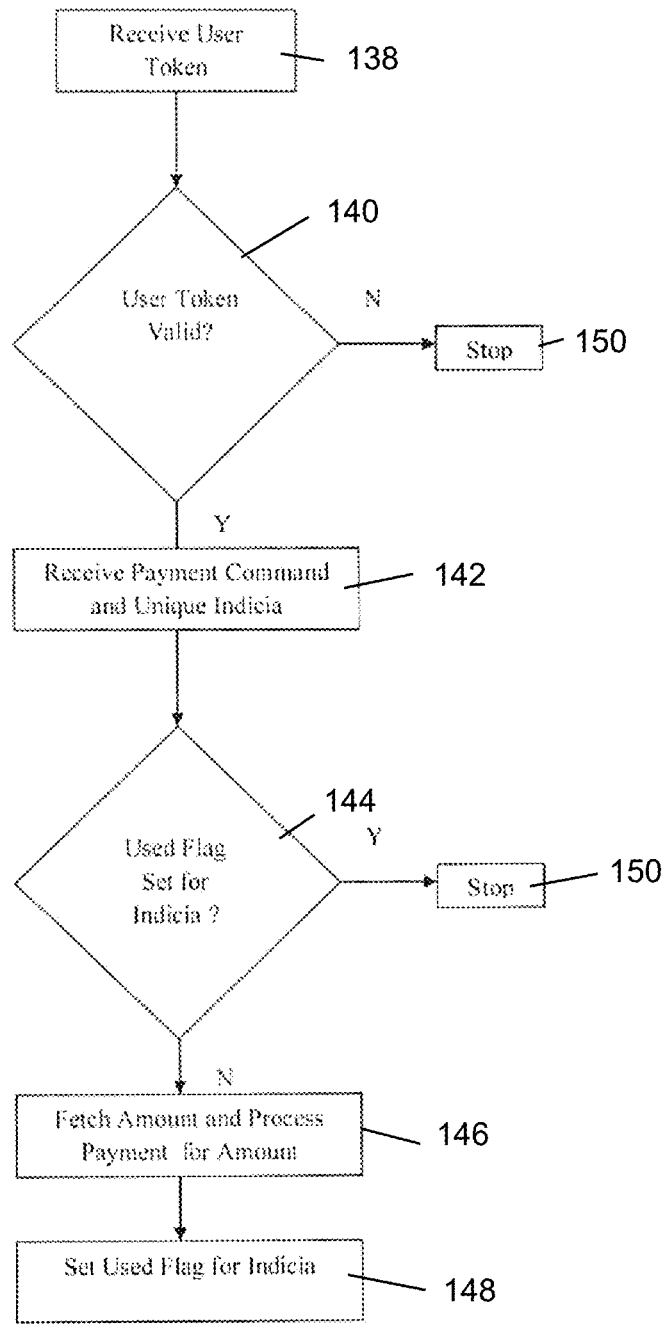
FIG. 22 depicts a flowchart according to aspects of the present invention.
Figure 23:
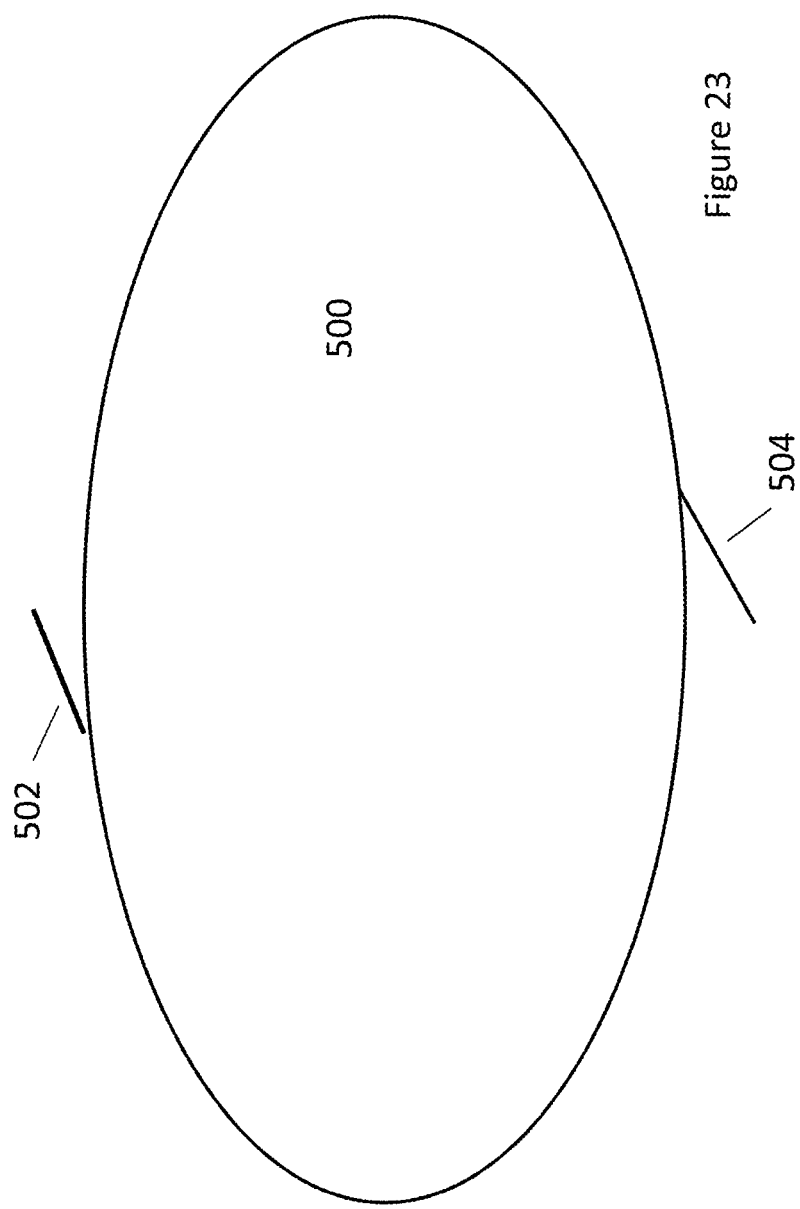
FIG. 23 depicts a secured area according to aspects of the present invention.

As depicted in FIG. 15, a merchant can use a point of sale system operated by the merchant to scan the display screen of the user's computing device. There may the following steps: receive scanned data of visual validating object from Merchant Point of Sale (78), determine channel name from received data (80), transmit through determined channel visual object representing transaction confirmation (82) and transmit through determined channel command to delete visual validating object (84). That point of sale system can then capture from the scanned image the channel name or a unique number that is uniquely mapped on the server to the channel name. That information is transmitted to the server as a challenge for verification. The received challenge data may be checked to see if it matches the channel name or corresponding unique number used to transmit the visual object that the merchant scanned. If they match up, there is a verification of a transaction. This exchange provides verification that the user's device is present at the merchant location and that a transaction with the merchant should be paid for. FIG. 20 depicts a flowchart according to the present invention. There may be the following steps: create indicia (118), print indicia (120), create data records for indicia (122), assign merchant ID to data records (124), assign value amount to data records (126). FIG. 21 depicts a flow chart according to the present invention. There may be the following steps: receive indicia (128), receive user token (130), determine if the user is valid (132), if no stop (136), if yes assign UserID to data record of unique indicia (134). FIG. 22 depicts a flowchart according to the present invention. There may be the following steps: receive user token (138), is the user token valid (140), if no, stop (150), if yes, receive payment command and unique indicia (142), determine is used flag set for indicia, if yes, stop (150), if no, fetch amount and process payment for amount (146), set used flag for indicia (148).

The persistent connection provides a means for the server to control the actions or the process operating on the user's computer device that is at the other end of the connection. In this embodiment, the server can automatically transmit a command to the process on the user's computing device that automatically deletes the verifying visual object that has been transmitted to ensure that it cannot be reused or copied.

The persistent connection may be used to automatically transmit visual information to the user's mobile computing device and to cause that information to be displayed on the screen of the device. The visual information can be the validating visual object or any other visual object that the server selects to transmit for display. In this embodiment, the persistent connection can be used by the server to transmit other information to the user's device. In this embodiment, the server transmits text, images, video or sound and in some cases in combination with other HTML data. The material may comprise advertising material that the server selects to display on the user's device. The selection process can utilize the GPS feature to determine the approximate location of the user's device and based on that location, select advertising appropriate to be transmitted to that device. The server may select the advertising content by determining predetermined features of the validation ticket or purchasing transaction and make a selection on the basis of those features. By way of example, a validation of a ticket to a baseball game played by a team specified in the data associated with the validated ticket may cause the selection of an offer to purchase a ticket for the next baseball game of the same team. The character of the transaction being verified may be used to cause the selection of advertising or the transmission of data comprising a discount offer related to the transaction.

The server may receive from the merchant the data that determines the persistent channel. The merchant, by relying on the system for payment will also transmit transaction details. For example, an amount of money and an identity of goods or services. When the channel name or unique number associated with the channel is matched for verification, the server can transmit data representing a confirmation display down to the user's device using the persistent connection. This data is received by the user computing device and then automatically rendered by the process at the other end of the channel connection.

The server may also use the transaction information to determine one or more advertisements or discount offers to transmit to the user's computing device. The selection method may consist of one or more heuristics. In one example, the validation of the ticket for a baseball game can trigger the display of advertising for food or drinks. Likewise, a transaction for purchasing a cup of coffee can trigger an advertisement for purchasing a newspaper.

Aspects of the present invention are directed to a system that determines ticket validity based on a proximity analysis (which may utilize an algorithm) that the token device on the consumer has a valid pass for entry into a venue, event or mode of transport and that the person has a valid entry pass to go through the turnstile or other entry port mechanism. This process may occur without the need to present the cell phone and without the need for the mobile device owner to do anything at the point of entry other than to have the device turned on with Bluetooth LE (or other wireless proximity detection devices) turned on. The technology surrounding wireless proximity detection is constantly evolving and the present invention envisions using any wireless proximity detection devices/protocols that are currently known and/or may be implemented in the future. By way of example, the wireless proximity detection devices may be selected from the group consisting of Bluetooth™ sensors, Bluetooth™ LE (Bluetooth low energy) sensors, antennas, Global Positioning Systems (GPS), cellular data, WiFi, cell signal detection, radio frequency sensors, cell signal detection on LTE (Long term evoluation), LTE Advanced and cell signal detection on GSM (Global System for Mobile Communication).

The system may be comprised of two or more Bluetooth le or other wireless proximity detection devices (e.g. sensors, antennas, cellular data, GPS and GSM) used to determine shared proximity. Shared proximity means that the data from all the devices indicates that the same mobile device is present at a pre-determined location relative to the predetermined locations of the sensors, for example, the center of the turnstile. The detection data from the proximity detecting devices is transmitted to a computer that uses the data to determine the exact location of the mobile device. The location may be determined according to triangulation. In the case of more than three sensors/devices, this works similar to triangulation, but the amount of sensors is not limited to three sensors. By placing proximity sensors at and around a turnstile, a user can be validated as a legitimate pass/ticket holder without the need to scan a piece of paper or present the phone to a ticket taker or barcode reading device.

The system requires the devices to communicate with one another either locally or communicate with a server to determine whether the ticket holder meets the required criteria for a valid pass holder. The multiple sensors allow for ticketed passengers to enter into a virtual box to determine exact perimeters and centralization of the phone to make sure the person with the valid pass/ticket is the actual person about to enter the gate. Different ways of calculating or determining location may be used. In one case, the sensors determine approximate distance of the same mobile device. Geometric calculations based on the predetermined location of the sensors will result in the location of the mobile device. In another embodiment, the sensor sensitivity profile may have a shape that results in a signal of a certain set of strengths at all corresponding sensors that only occurs when the mobile device is at a predetermined location relative to the sensors. A third methodology is to combine location detection methods. For example, a light beam or ultrasonic sensor may be tripped to indicate that a person is within the box. At that instant, the sensor may be only one antenna with such a low sensitivity that it only captures the signal from a device located in the box. The system then determines that the mobile device so detected is the one in the box. As a further iteration of this concept, the phone as part of the validation process can determine whether the device has more than one valid ticket associated with it and allow for multiple entries if there are multiple tickets available and set for use on the mobile device. The light beam or ultrasonic sensor may also be used to indicate the number of persons that have passed. For example, if more than one ticket is issued in a single token device, the light beam or ultrasonic sensor may determine and allow entry for a number of persons corresponding to the number of valid tickets.

Figure 4:
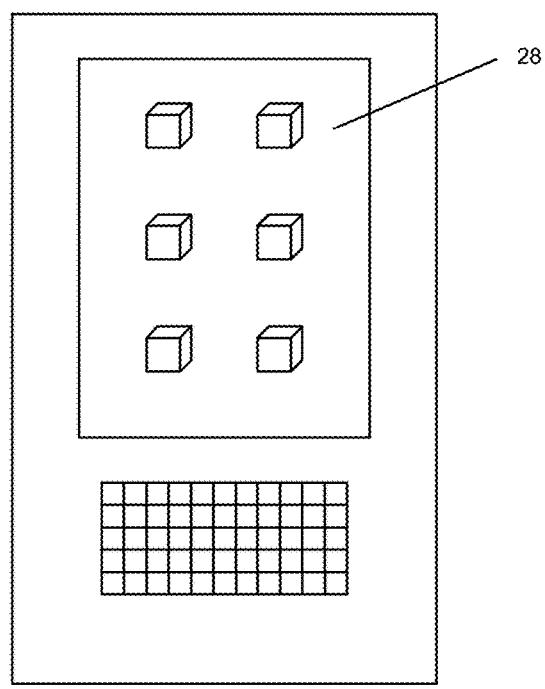
FIG. 4 depicts an example of a validating visual object according to aspects of the present invention.
Figure 5:
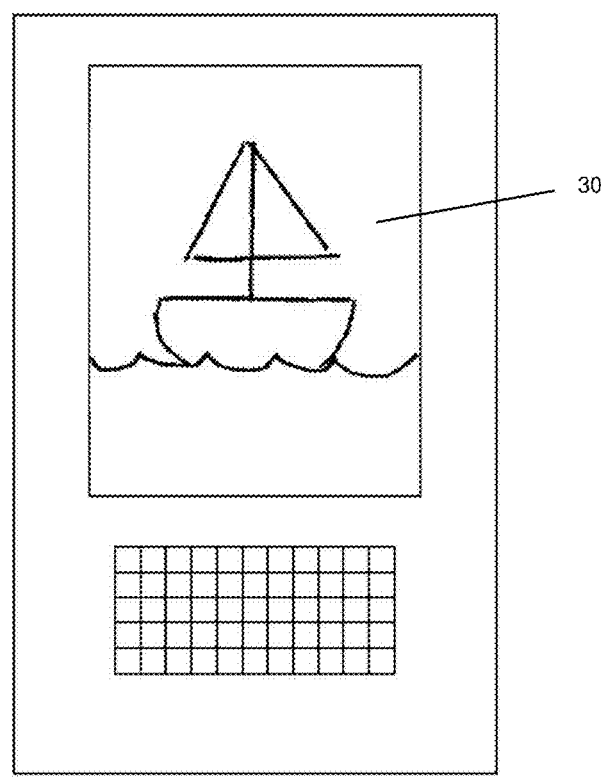
FIG. 5 depicts an example of a validating visual object according to aspects of the present invention.

In another embodiment, Bluetooth LE, wireless proximity analysis, GPS and geo-fencing arc used as a form of secondary validation for entry verification. The primary validation methods can include human-based visual validation of a ticket or pass, automated license plate reading, fingerprint scanning, facial recognition, or a unique alphanumeric ID entry via a keyboard or numeric keypad (telephone number generally) as the means of primary ID and the cell phone via Bluetooth LE, wireless proximity analysis, GPS or geofencing validates the individual and the account for the purposes of entry. This can be for toll roads, turnstiles, building security, gym memberships and other venue entry. As shown in FIGS. 4 and 5, there may be validating visual object (e.g. 28 and 30) displayed on the user's token device (for example, a mobile phone).

For the purposes of parking, in-car payment verification, restaurant payment validation and ticket validation, a token device using wireless token/ key exchange to indicate a successful payment has been completed or that a valid ticket has been activated. This token exchange can occur via NFC, Bluetooth, WiFi or any other radio frequency transmission integrated into the light system. If a valid payment or ticket activation has occurred on the mobile device, the user will be issued a key/token that will allow them to turn on a light at the seat, car or table or indicate on another device display that the validation has occurred (or alternatively, has not occurred). For example, if a person uses a cellphone to pay for a bill at a restaurant, the device receives a key that allows that person to activate a light at the table. The light could be green (or any color) to indicate a valid payment has been completed.

Another example is that a person sitting on a train or other transit can use the local ticket verification to actuate a light embedded into the seat in front. The person is able to activate the light using the encrypted key transmitted to the phone, which is then locally transmitted to a device controlling the light. When the ticket taker walks through the train car, he does not need to stop at the seats where there is an active light because that ticket hold has already been activated. The present invention may also be utilized to assist the visually impaired. A person who is visually impaired would have the capability to get onto a bus, train, or boat and they would receive a vibration or noise on their token device (e.g. mobile phone) to indicate that their ticket has been validated and that they have valid entry. A similar concept can be added for handicap access onto transit system where there are special service doors for disable passengers to enter an exit a transit system.

Figure 16:
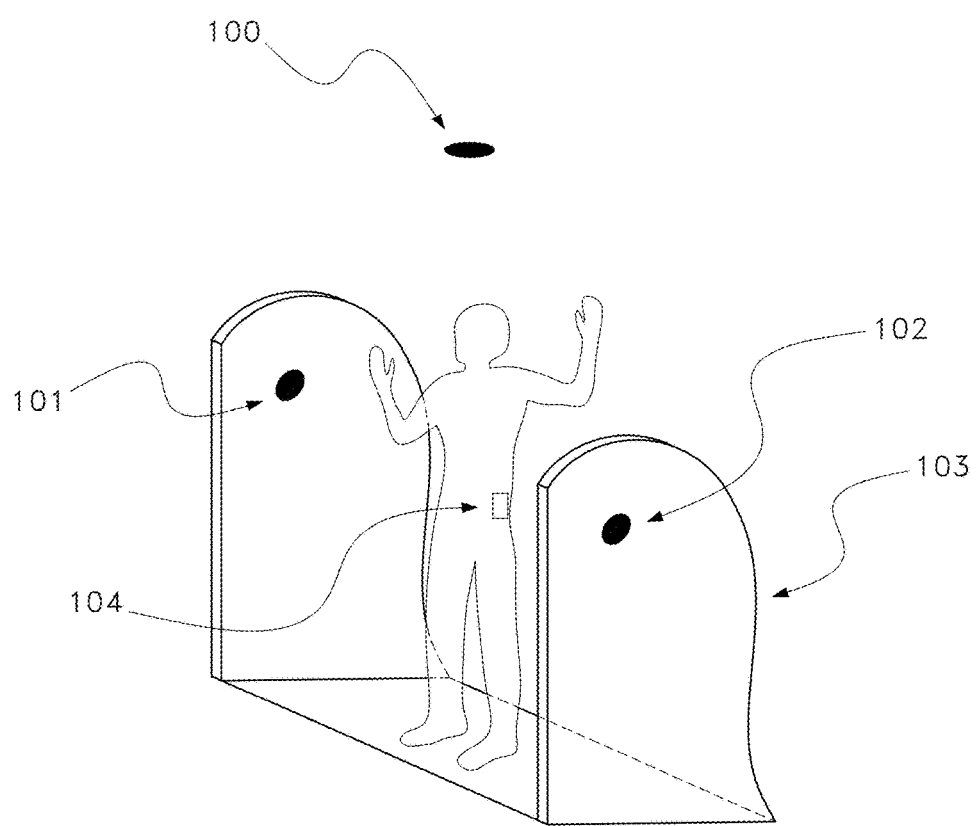
FIG. 16 depicts an example of a mechanical gate according to aspects of the present invention.
Figure 17:
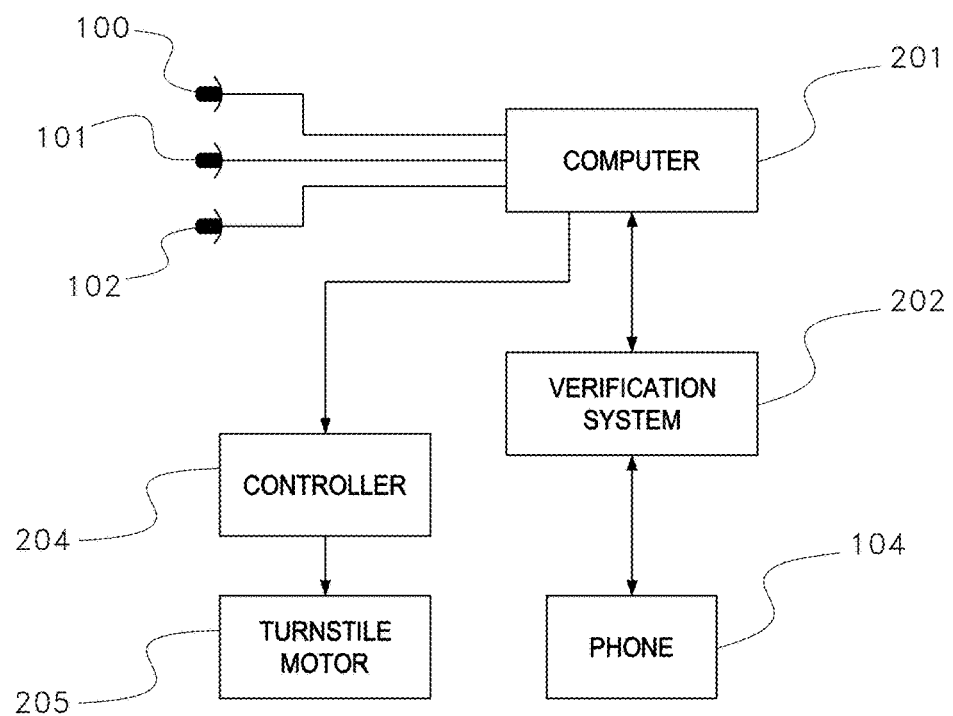
FIG. 17 depicts an example of system architecture according to aspects of the present invention.
Figure 18:
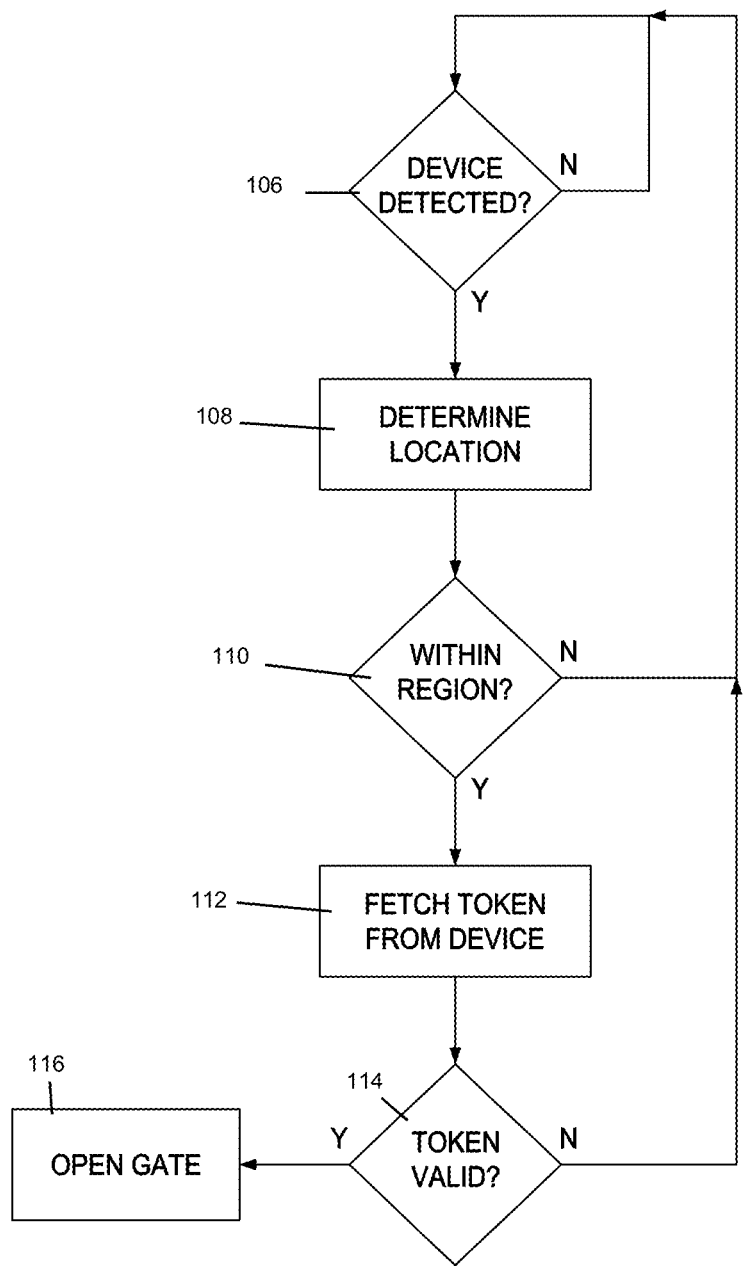
FIG. 18 depicts a flowchart for proximity detection and validation according to aspects of the present invention.

Referring to FIG. 16, there may be sensors (100, 101 and 102) that are situated to be able to detect the token device, mobile phone (104) located in the turnstile (103). Referring to FIG. 17, the sensors (100, 101 and 102) are operatively connected to a system computing device, which may be a system of several computers and/or servers that further transmit data. The system can use the data received to determine the location. The system computing device(s) are operatively connected to the ticketing verification system (202). The system computing device interacts with the mobile phone (104) to provide a token or otherwise verify that the token device (e.g. mobile phone 104) is associated with valid tickets for the turnstile. Upon validation, the system computing device 201 send a command to a turnstile controller 204, which actuates the turnstile motor 205. In the case of two or more tickets, the turnstile motor 205 would allow entry for a number of persons corresponding to the number of valid tickets. FIG. 18 depicts an example of the logic sequence. There may be the step of detecting the device (106), if a device is detected, there is the step of determine location (108), if it is within a region (110), fetch token from device (112), determine if the token is valid (114) and if the token is valid Open gate (116). Practitioners of ordinary skill will recognize that the specific sequence depicted is not limiting because ticket verification could precede location confirmation.

The system may also utilize two wireless proximity detection devices to be able to determine the location of a token device within an area. The location is sufficiently accurate as to be able to determine the location of a token device localized to a specific seat. This may be achieved by having an array of Bluetooth antennas situation on the ceiling of a seating area. Additionally, there may be a data file stored in the system that contains a map of sub-areas to specific seat numbers. For example, each sub-area may be a rectangle two (2) feet wide and three (3) feet long. The system may use the coordinates of the token device to determine that the seat that the token device is located in. According to one embodiment, the system calculates Cartesian coordinates X, Y for the location of the token device in the plane defined by X and Y. The map data file contains a list of seats where for each seat there is a range of the highest and lowest X and highest and lowest Y that are occupied by the seat. The program logic searches the map files for the seat entry who maximum and minimum X, Y encompass the detected X, Y coordinates. This is the seat location of the device. The program logic can then use the ticket identifying information retrieved from the device to determine whether the ticket itself corresponds to the detected seat entry. Then the ticket can be automatically checked without having to disturb the passenger. An example application is as follows: A passenger walks onto a train, bus, ferry or airplane with a ticket that they have either themselves activated or that was activated prior to boarding. The ticket could have been activated using a number of different methods. It could have been self-validating, a 2D barcode, NFC or even Bluetooth prior to boarding. Once the ticket is validating the Bluetooth proximity detection is activated and knows exactly where passengers are sitting with an activated ticket. It knows who that user is and what types of ticket they have by referring to the data records associated with the ticket, using the retrieved ticket identifier to query a database. The key to this process is around the backend information that is then made available to the conductor or person who is validating tickets. The conductor app tells them that a person is already validated and therefore they do not need to ask that person for a ticket. This increases efficiency by making sure that the conductor is not spending time asking for tickets from people who already have an active ticket while also minimizing additional infrastructure. In another embodiment, a light is activated for a seat where a validated passenger is sitting. The system by knowing the seat and whether the ticket is valid can send a command to the seat to turn a light on or off. In the case of single token device being used for multiple tickets, the entire group of seats may be lit up. The Bluetooth Proximity sensor can send a message to the light to turn on or off based on where a person is sitting and whether they have a valid ticket or tickets on their phone. In this scenario the Bluetooth Proximity detection essentially operates as a secondary form of ticket validation. The proximity sensors drive data to a conductor handheld device or similar device as well as to a seatback light or similar device that provides visual verification that the person sitting in the seat has a valid ticket. This also makes it easier for conductors to keep track of people who decide to move between cars for whatever reason because so long as their ticket is still valid, the new seat where they are sitting will show that they are a validated passenger even if the train car they move to has different conductor. In this embodiment, the proximity detection system detects the entry of a new ticket holder and one that holder occupies a seat they may use (for example in a unreserved seating area), the ticket may be validated. On an airplane, flight attendants receive a manifest of who is on the airplane. With Bluetooth proximity detection, they can know which passengers are in which seats, whether they are in their correct seats, whether someone who should be on the plane is not on the plane and for VIP/Frequent Flyers, they can have more dynamic details about who that person is and their flying preferences. Similarly, now that many airlines are deploying entertainment systems in seatbacks, they can also have the preferences at the seat be updated dynamically. Does the person prefer Spanish or English? Does the person like Drama or Comedy? All of a sudden, a network user profile can be assigned to seatback systems based on the Bluetooth proximity detection because that proximity detection is associated with a unique user profile that allows for a whole host of preferences that can be dynamically assigned. In this embodiment, the proximity system detects which ticket is occupying which seat. The system then is able to access from a database user preferences by means of a user identifier associated with the ticket data record. The system can then transmit as data, to the equipment comprising the in-flight entertainment system associated with the user, the user preferences which are then utilized by the entertainment system for presentation to that user.

This application can also carry over into advertising. The advertising that is presented in the in-flight entertainment system can be customized for that specific user based on the data that is known about the user identifier associated with the validated ticket. The ability for Bluetooth proximity ticketing to drive a customized experience around air travel (and potentially train travel for longer distance train services that are more commonly used in Europe) can have a huge impact on customer service and ridership experience. This also may apply to stadiums and events and customizing the in seat experience along with the information fed back to the seat attendant for likes/dislikes of the person sitting in the seat. Is that person more likely to buy water, soda or beer? You can all of a sudden build models of efficiency around how food sales happen at events and stadiums based on these details and profile information.

One of the issues faced with logistics management for buses in particular and why this is useful is that most buses are simply a tap on system. Which is to say that they validate their fare when they get on the bus, but they do not provide any validation when they get off the bus. By implementing Bluetooth proximity detection solutions, you now have tracking capabilities that provide bus operators with real time logistics around the load factor of buses. How many people are actually on the bus at a single point in time. Should they be running more buses? Could they reduce their buses? A system is created that does not require the user to do anything and you have valuable tracking information around who that user is and what their daily patterns are. A lot of bus and subway system know what users origins are but they have no idea what their destinations are because they don't have good tracking around this. To create a data statistical analysis around this data would be extremely helpful to increase efficiencies on transit systems and make services more dynamic based on the demand. Ferry services that run along certain routes like the Thames Clippers in London face the same issue of not knowing where the rider's destination is located. In this embodiment, the passenger exiting the boat is detected and that data records updated to indicate what the entire trip was. This solution also goes further for stadiums and events. You can now know when certain users leave the venue. One issue faces by sporting events is that they always want to have the seats closest to the field or court filled because those are the ones that appear on television. If people get up and leave for whatever reason, you can start to build systems where you offer people further back the ability to upgrade their seat and move closer to the action while also improving the media optics of an event by making it look well attended and therefore popular. The present invention detects that that a premium seat ticketholder has left the stadium. As a result, the system can then transmit to the devices of other ticket holders who are present in the stadium, a message that a particular set of seats are available. This can even be done granularly where for each of the other ticket holds is assigned an upgrade seat automatically and gets a unique alert inviting them to that specific seat. The system can use any sort of promotional device to determine which of the other ticket holders are serviced this way. For example, based on ticket buying habits or other information about the ticket holders.

The present invention may utilize Bluetooth proximity detection by virtue of someone exiting the bus to charge a customer based on zone information. In this embodiment, a person obtains a ticket authorization to board a bus or other transmit vehicle, but the proximity detector that determines when the person exited then runs the purchase transaction to pay for the appropriate fare. In this system, the proximity detector works in concert with a bus navigation system so that the overall ticketing system can determine the condition of the person exiting the bus at the same time as detecting the location of the bus. The system may have a file respecting a fare zone map so that the location of the bus can be used to determine the appropriate fare to charge. The payment transaction is triggered by the condition of the person leaving the bus.

One difficulty with applying this solution in such a way is that riders could easily turn their phone off or the phone could die and they be charged a zone a to B fare when in fact they should be charged a zone A to C fare. With zone based charges it may be desirable to do an NFC or 2D barcode solution where you are tapping on and tapping off to make it effective. The application of this solution could also have potential uses around how much an attendee to an event should be charged if they went to an event where they attended 1 session or 2 sessions.

One of the other backend data solutions is the ability to integrate GRFS (General Transit Feed Service) Real time data into real time traffic reporting and analysis to better direct traffic that might be impeded and backed up as a result of train or bus. For example, if a bus is stalled or broken down, you now that traffic is more likely to get back up. If train service is coming through that will cause a traffic stop for an extended period of time, you know that traffic will get backed up. One of the problems as it stands right now is that traffic data is fed over things like Google Maps trip planning is based on real time information. Generally though if you are making decisions based on how traffic is impacted in real time, you are probably already stuck in traffic. By integrating transit historical and planning data that know where trains, light rail and buses will be at on the road over the next hour, you can better predict where traffic should be directed to. You can make better trip planning recommendations based on where a person is going to be over the course of a 30-60 minute trip because you are no longer just basing the data on real time conditions but also integrating the predictive analytics traffic conditions based on how mass transit impacts traffic flow.

Another point of predictive analysis is the ability for using ticketing data to determine traffic conditions in specific areas around a metropolitan area. In this embodiment, there is a combination of mobile tickets between transit, events and venues. By knowing where people are going and how they are getting there, you can create predictive measures around traffic flow and control. Should the city open up more lanes going one direction versus another direction? Are people leaving an event early and therefore traffic flow will be more controlled? Integrating ticketing data around transit and traffic planning can have a huge impact on the experience. Let's look at the Super Bowl as an example. People were trapped out at the stadium for over 2 hours because NJ transit was not running enough trains. This was the result of weather being warmer than originally anticipated so more people went out to the stadium than was expected. The system can analyze in real time that the actual attendance at the event was at a certain level and, for example, how many attendees arrived by train or mass transit. By means of this data, the transit system can determine that at the end of the event, how many train cars and/or buses are required to service the crowds of attendees.

The system operates on one or more computers, typically one or more file servers connected to the Internet. The system is typically comprised of a central server that is connected by a data network to a user's computer. The central server may be comprised of one or more computers connected to one or more mass storage devices. A website is a central server that is connected to the Internet. The typical website has one or more files, referred to as webpages, that are transmitted to a user's computer so that the user's computer displays an interface in dependence on the contents of the webpage file. The webpage file can contain HTML or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a firewall to one server, which routes communications to another server that executes the disclosed methods. The precise details of the data network architecture does not limit the claimed invention. Further, the user's computer may be a laptop or desktop type of personal computer. It can also be a cell phone, smartphone or other handheld device. The precise form factor of the user's computer does not limit the claimed invention. In one embodiment, the user's computer is omitted and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays and interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or multiple computers on a network with network accessed storage, in a manner that provides such functionality as a group. Practitioners of ordinary skill will recognize that functions are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The methods described herein can be executed on a computer system, generally comprised of a central processing unit (CPU) that is operatively connected to a memory device, data input and output circuitry (10) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the 10 circuitry of the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Figure 24:
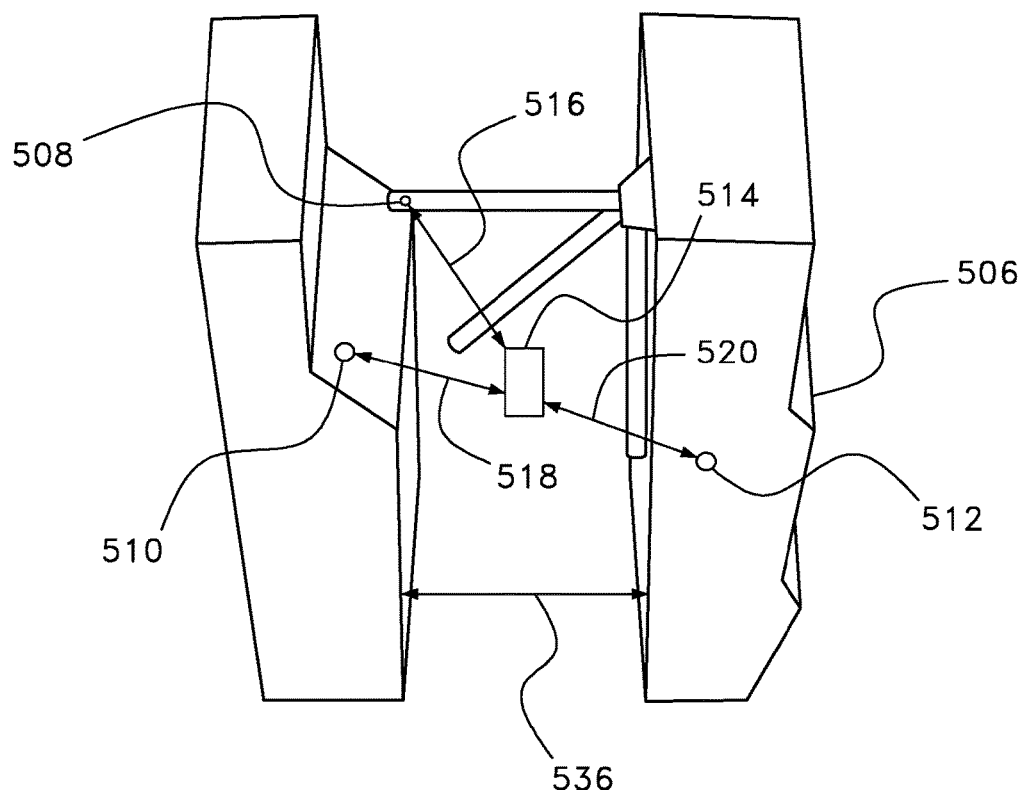
FIG. 24 depicts a mechanical gate according to aspects of the present invention.

The present invention provides a system for monitoring permission for persons to be in a location. The system may have a secured area (500) having at least one entry point (502, 504). Each of the entry points have a mechanical gate with an open position and a closed position. FIG. 24 depicts a turnstile (506) as an example of a mechanical gate. It should be understood that the mechanical gate could take many forms. It could even be an open box, in which the open position is that in which entry to the secured area (500) is allowed. This is meant to say, that it is not required that there is a physical bar that blocks entry, it could be monitored by a human and entry allowed (indicating an open position) or denied (as in a closed position). There may be at least one wireless proximity detection devices (e.g. 508, 510 and 512) attached to at least one of a portion of the mechanical gate and an area adjacent to a portion of the mechanical gate. The wireless proximity detection devices could be placed anywhere around or near the mechanical gate that is convenient. There is also a token device in communication with the wireless proximity detection devices. The term "token device" is intended to indicate any device that may hold a token. By way of example, the token device may be a mobile phone (as depicted in FIG. 1, mobile phone 1), smartphone, computing device, luggage tag, lanyard, card, physical ticket, shipping label with barcode, NFC, RFID, UDID or Bluetooth ID. Each of the wireless proximity detection devices (e.g. 508, 510 and 512) determine a location of the token device relative to one of the wireless proximity detection devices to provide a detection data point for each of the at least two wireless proximity detection devices and a set of detection data points for the group of detection data points. A detection data point, may be, for example coordinates or any other way of indicating and recording a location point. When you group together the detection data points, you have a set of detection data points. This would be data stored in the database (3) or system server (2). As would be understood by one of ordinary skill in the art, the system computing device may be a network of computers or the system server (2) in conjunction with the database (3). The system computing device (e.g. server 2) may be in communication with the at least two wireless proximity detection devices (e.g. 508, 510, 512) over the internet (4) or any wireless communication. The wireless proximity detection devices may be, for example, Bluetooth sensors, Bluetooth LE sensors, antennas, WiFi, cell signal detection, radio frequency sensors, cell signal detection on LTE, LTE advances and cell signal detection on GSM. It should be understood the term wireless proximity detection device is intended to include any device that is wireless and can sense proximate location. The system computing device calculates the shared proximity of the token device according to the set of detection data points. The system computing device also determines that the token device contains a valid ticket or does not contain a valid ticket. FIG. 9 depicts an example of a token device (mobile phone 22) with a valid ticket (20). If token device contains a valid ticket and the system computing device determines the shared proximity of the token device is within a predetermined area the system computing device will cause the mechanical gate to go to the open position. By way of example, the predetermined area may the area inside the turnstile (as depicted in FIG. 24). Other examples may be, as shown in FIG. 16, the area in between two barriers may be designated as the predetermined area. The system computing device may also cause the mechanical gate to go to a closed position upon determining that the shared proximity of the token device is outside a predetermined area. This may not be required, as in a turnstile. But, for applications in which a mechanical barrier closes, it may be desirable to cause the mechanical date to enter a closed position.

Figure 25:
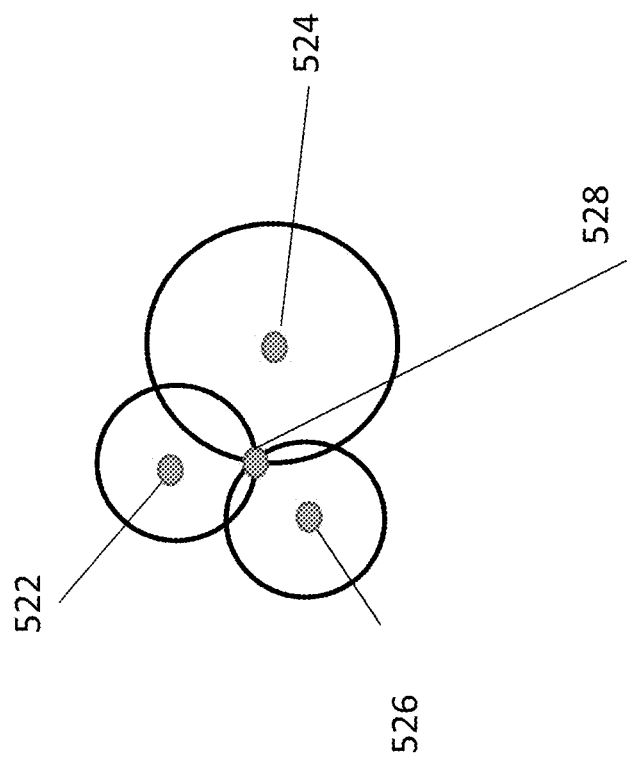
FIG. 25 depicts shared proximity of the token device according to aspects of the present invention.

The system computing device calculates the shared proximity of the token device according to triangulation of the set of detection data points. This may occur, by way of example, by determining the distance (516) from the token device (514) to wireless proximity detection device (501), the distance (518) from token device (514) to wireless proximity detection device (510) and the distance (520) from token device (514) to wireless proximity detection device (512). According to this example, there may be at least two wireless proximity detection devices (501) to determine the shared proximity. Another example of triangulation may use the cell phone signal detection. See, for example, FIG. 25, there may be a cell phone base (522), cell phone base (524) and cell phone base (526). In the middle in the token device (mobile phone 528).

Figure 26:
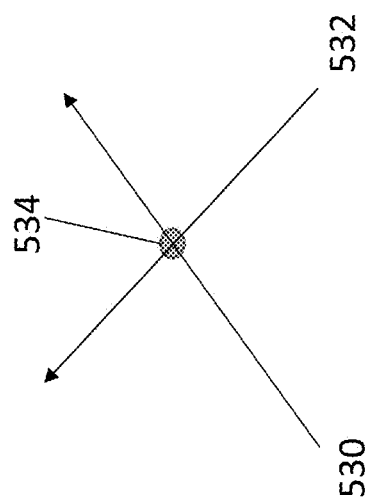
FIG. 26 depicts shared proximity of the token device according to aspects of the present invention.

The distance to the token device (mobile phone 528) is determined by measuring the relative time delays in the signals from the phone set to the three cell phone base stations (522, 524 and 526). As shown in FIG. 26, directional antennas at two cell phone base stations (530 and 532) can be used to pinpoint the location of a token device (mobile phone 528). As can be seen, the system computing device may calculate the shared proximity of the token device according to geometric calculations of the set of detection data points. The system computing device may also calculate the shared proximity of the token device according to a sensor sensitivity profile. In one example, the shared proximity of the token device is determined according to a sensor sensitivity profile that has a predetermined range of shapes from a signal of a predetermined set of strengths at each of the at least two wireless proximity detection devices and determines that the shared proximity of the token device is within the predetermined area to cause the mechanical gate to go to the open position only when the sensor sensitivity profile is in the predetermined range of shapes.

There may also be at least one light beam (e.g. 536) in the mechanical gate. If the light beam (e.g. 536) is tripped, the token device must contain a valid ticket and the system computing device must determine the shared proximity of the token device to be within a predetermined area for mechanical gate to go to the open position. This would provide an additional level of detection that a person is in the mechanical gate. The present invention envisions many forms of additional ticket validation. There must be the additional ticket validation, the token device must contain a valid ticket and the system computing device must determine the shared proximity of the token device to be within a predetermined area for mechanical gate to go to the open position.

Examples of additional ticket validation may be visual validation, fingerprint scanning, sound sampling, facial recognition, a light beam, Bluetooth LE, wireless proximity analysis, GPS, geo-fencing, automated license plate reading, fingerprint scanning, facial recognition, unique alphanumeric ID entry via a keyboard, numeric keypad. The shared proximity of the token device may also be determined according to one detection data point in the set of detection data points and the at least one light beam. For example, a light beam or ultrasonic sensor may be tripped to indicate that a person is within an area (for example the turnstile or a box). At that instant, the sensor may be only one antenna with such a low sensitivity that it only captures the signal from a device located in the box.

As described in detail above, the token device (536) may be determined to contain valid tickets by having a stored ticket token (538) that is transmitted to the system computing device (e.g. server 2). The stored ticket token (538) may be transmitted to the system computing device (e.g. server 2) over a secure data channel (54). The stored ticket token (536) may be token device IMEI number, token device UDID and the token device serial number and any combination of the token device IMEI number, token device UDID and the token device serial number and any combination of portions of the token device IMEI number, token device UDID and the token device serial number. Where the is a secure data channel (54) between the token device (536) and the computing device (e.g. server 2), the computing device may determine that the token device contains valid tickets or does not contain a valid ticket by fetching a stored ticket token on the token device and transmitting the stored ticket token from the token device to the computing device over the secure data channel.

A ticket (or tickets) may require activation to be a valid ticket. For example, tickets for mass transit may be required to be activated to be used. It may be useful to have an activated ticket indicator for valid tickets that have been activated. For example, there could be a ticket viewable on the screen of the mobile phone that is a certain color.

Figure 27:
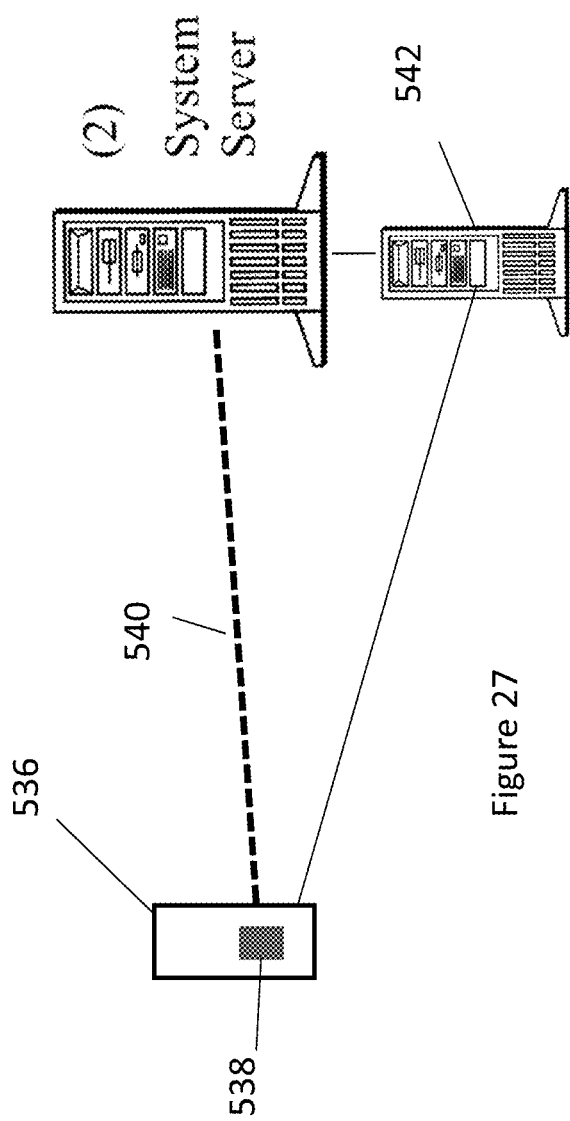
FIG. 27 depicts a ticketing verification system according to aspects of the present invention.

As depicted in FIG. 27, there may also be a ticketing verification system (542) in communication with the token device (536). It should be understood that the ticketing verification system (542) may be in direct communication with the token device (536) or may communication through the system computing device (e.g. server 2). The ticketing verification system (542) provides the token device (536) with a valid ticket and the system computing device (e.g. server 2) determines that the token device contains a valid ticket from the ticketing verification system to cause the mechanical gate to go to the open position.

Figure 28:
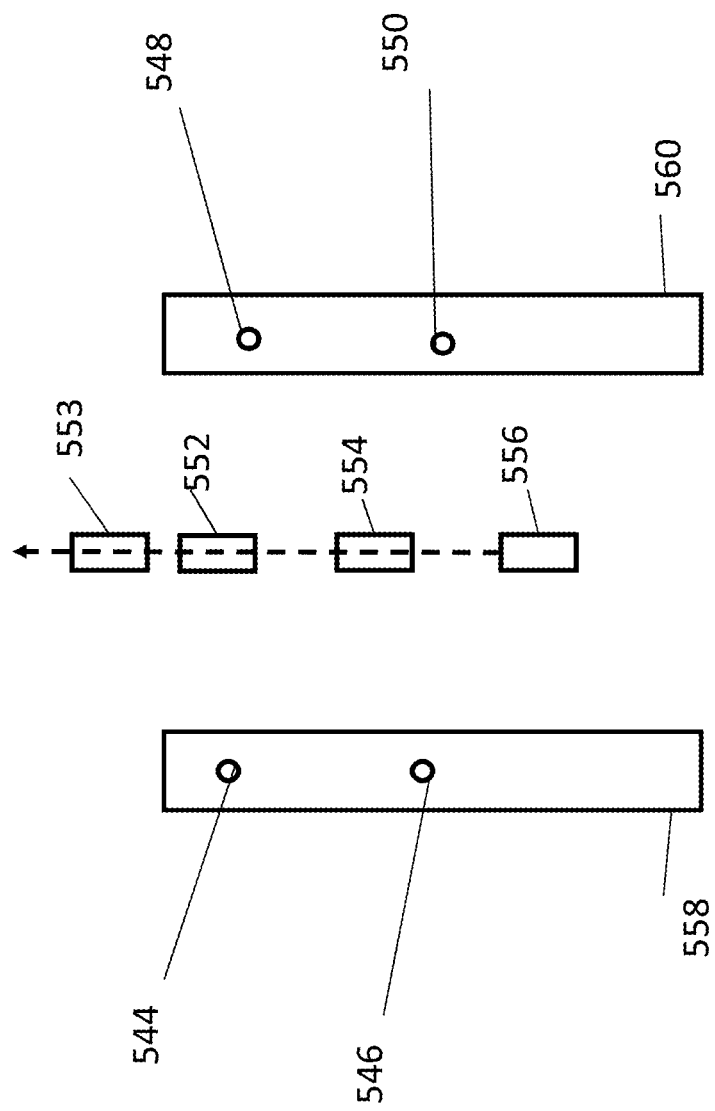
FIG. 28 depicts a mechanical gate with wireless proximity detection devices according to the present invention.

The present invention also envisions determining that the shared proximity of the token device is outside a predetermined area and directing, by the system computing device, the mechanical gate to go to closed position (or an access denied indicated to be displayed). There may be the step of calculating, by system computing device, the shared proximity of the token device. This may be according to triangulation of the set of detection data points, by geometric calculations of the set of detection data points, according to a sensor sensitivity profile or according to a sensor sensitivity profile that has a predetermined range of shapes from a signal of a predetermined set of strengths at each of the at least two wireless proximity sensors and the system computing device determines that the shared proximity of the token device is within the predetermined area to cause the mechanical gate to go to the open position only when the sensor sensitivity profile is in the predetermined range of shapes. FIG. 28 depicts an example in which the wireless proximity detection devices (e.g. 544, 546, 548 and 550) are arranged along a portion of either side of two barriers (558, 560) which form the mechanical gate. The wireless proximity detection devices (e.g. 544, 546, 548 and 550) detect the token device (552, 554 and 556). FIG. 28 depicts a single token device in many positions, as would be the case of a mobile phone being carried through the barriers. For example, wireless proximity detection device 550 can detect the token device when it is at position 556 as being 1 feet away, it may also detect the token device at position 554 as being one foot away, at position 556 the wireless proximity detection device may detect the token device at 2 feet away, at position 553 the wireless proximity detection device may detect the token device at 3 feet away. The pathway following process would show an intent to utilize a token, by virtue of the token device moving in a certain direction. The shape of the sensor sensitivity profile may be a trapezoid, triangle and/or pyramid. It may be any desired shape, but those are examples of shapes. You have the various wireless proximity sensor sites on the validator that are moving almost like a laser beam as the token device/ mobile device moves through the gate. Depending on the number of sensors installed, that shape could look more like a pyramid with a varying number of sides that are beaming to the mobile device. Of course there has to be some level of fault tolerance around this because you could also have a scenario where one sensor is not detecting the device while others are, which is one reason to have at least three wireless proximity detection devices on the gate, although the goal of the technology could be accomplished with just two. You could also just have one wireless proximity sensor operating. For example, you could have one wireless proximity sensor on the gate and use cell signal detection as another wireless proximity detection device.

There may be the steps of establishing a secure data channel (540) between the token device (536) and the computing device (e.g. server 2); determining, by the computing device, that the token device contains a valid ticket or does not contain a valid ticket by fetching a stored ticket token on the token device; and transmitting the stored ticket token from the token device to the computing device over the secure data channel.

Figure 29:
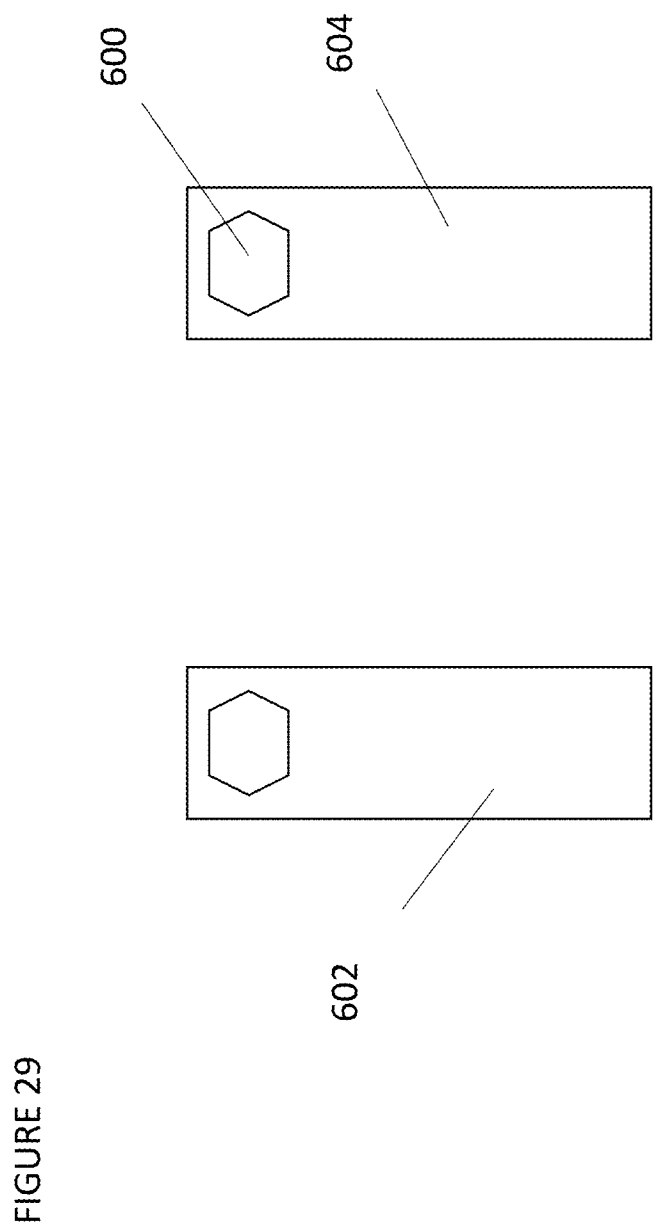
FIG. 29 depicts an entry point with an access allowed indication or an access denied indication.

According to one embodiment, a system for monitoring permission for at least two persons to be in a location is provided, the system comprising: a secured area having at least one entry point. FIG. 29 depicts an entry point with a left barrier (602) and a right barrier (604), having an access allowed indication or an access denied indication (600). The access allowed indication or access denied indication (600) may take many forms and be located in many different places along or around the entry point. It may be, for example a green light to provide an access allowed indication and a red light to provide an access denied indication. Of course, there are endless other possibilities, such as displaying "GO" for an access allowed indication or "STOP" for an access denied indication. There may be at least one wireless proximity detection device (e.g. 544, 546, 548 and 550) in at least one of a portion of the entry point and an area adjacent to the entry point. A token device (e.g. 1) may be in communication with the at least one wireless proximity detection device. Each of the at least one wireless proximity detection devices determine a location of the token device relative to at least one of the at least one wireless proximity detection devices to provide a detection data point for each of the at least one wireless proximity detection devices and a set of detection data points for the group of detection data points. A system computing device (e.g. system server (2) and database (3)) may be in communication with the at least one wireless proximity detection devices, wherein the system computing device calculates the shared proximity of the token device according to the set of detection data points and determines that the token device contains at least two valid tickets or does not contain a valid ticket, wherein the token device contains at least two valid tickets and the system computing device determines the shared proximity of the token device is within a predetermined area the system computing device will cause the access allowed indication to display to allow entry for a number of persons corresponding to the number of the at least two valid tickets. There may or may not be an attendant who monitors the access allowed indication (for example a light).

Referring to FIG. 30, two ticket issuing entities (300, 302) have computer systems that are operatively connected to the ticket management system (e.g. ticket purchase system 304). That system is comprised of a database (306), which is further comprised of a data record associated with the user. The user may have any number of tickets, but each ticket (e.g. 308) is associated with an issuer (e.g. (310, 312). A given ticket issuing entity can log into the ticket purchasing system and view all of the tickets it has issued or a subset based on a query, for example, all tickets for a particular event, or issued to a particular user or device. The ticket issuer is authorized by the ticket management system to only have the authority to view its own tickets and specific information related to the ticket. The system will shield the user's other ticket data or private information from the ticket issuer as appropriate. When the ticket issuer has finished modifying or managing the ticket entry, the ticket may then be issued to the user's device. Practitioners of ordinary skill will recognize that the embodiments of the database data records presented as a flat database the may also be equivalently expressed as a series of relational tables. The activation process can also permit a ticket to be shared. In this embodiment, the user who has activated the ticket can submit to the server a request that the ticket be transferred to another user. For example, a data message can be transmitted from the user's device to the system that embodies a request to move the ticket to another user. In that case, the stored token is marked as blocked, or is equivalently considered not present. This is accomplished by storing a data flag in the database that corresponds to the ticket. One logic state encodes normal use and the opposite logic state encodes that the ticket has been shared. A data message may be transmitted to the second user indicating that the ticket is available for activation, The second user may submit a request to activate the ticket and a random token value is transmitted from the second user's device to the server. That second token value is checked to see if it's the first activation. Because the first user has activated the ticket, but then transferred it, the activation by the second user is not blocked, That is, the server detects that the first token is now cancelled or equivalently, the system has returned to the state where the first activation has not occurred and therefore permits the new activation to take place. The new activation can also have a predetermined time to live value stored in the database that is associated with it. In this case, the activation by the second user expires and the second user can be prevented from reactivating the ticket. At the same time, the flag setting that disables the first token can be reset, thereby setting the ticket up for reactivation by the first user. By this mechanism, it is possible for the electronic ticket to be lent from one user to another.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

We claim:

1. A system for monitoring permission for at least two persons to be in a location, said system comprising:
    a secured area having at least one entry point, wherein each of the entry points have a mechanical gate with an open position and a closed position;
    at least two wireless Bluetooth low energy proximity devices, wherein at least one wireless proximity detection device is in at least one of a portion of the mechanical gate and an area adjacent to a portion of the mechanical gate;
    a mobile phone token device in communication with the at least two wireless Bluetooth low energy proximity detection devices and a system computing device in communication with the at least two Bluetooth low energy wireless proximity detection devices, wherein each of the at least two Bluetooth low energy wireless proximity detection devices are used by the system computing device to determine a relative location of the mobile phone token device relative to at least one of the at least two wireless proximity detection devices according to signal strength to provide a detection data point for each of the at least two wireless proximity detection devices and a set of detection data points for the group of detection data points;
    wherein the system computing device calculates the shared proximity of the mobile phone token device according to the set of detection data points and determines that the mobile phone token device contains at least two valid tickets or does not contain a valid ticket, wherein the mobile phone token device contains at least two valid tickets and the system computing device determines the shared proximity of the mobile phone token device is within a predetermined area the system computing device will cause the mechanical gate to go to the open position to allow entry for a number of persons corresponding to the number of at least two valid tickets.

2. A system as in claim 1, further comprises at least one additional wireless proximity detection device, wherein the additional wireless proximity detection device is selected from the group consisting of Bluetooth sensors, Bluetooth LE sensors, antennas, Global Positioning Systems (GPS), cellular data, WiFi, cell signal detection, radio frequency sensors, cell signal detection on LTE, LTE Advanced and cell signal detection on GSM.

3. A system as in claim 1, wherein the system computing device causes the mechanical gate to go to a closed position upon determining that the shared proximity of the mobile phone token device is outside a predetermined area.

4. A system as in claim 1, wherein the system computing device calculates the shared proximity of the mobile phone token device according to triangulation of the set of detection data points.

5. A system as in claim 1, wherein the system computing device calculates the shared proximity of the mobile phone token device according to geometric calculations of the set of detection data points.

6. A system as in claim 1, wherein the system computing device calculates the shared proximity of the mobile phone token device according to a sensor sensitivity profile.

7. A system as in claim 1, wherein the system computing device calculates the shared proximity of the mobile phone token device according to a sensor sensitivity profile that has a predetermined range of shapes from a signal of a predetermined set of strengths at each of the at least two wireless proximity detection devices and determines that the shared proximity of the mobile phone token device is within the predetermined area to cause the mechanical gate to go to the open position only when the sensor sensitivity profile is in the predetermined range of shapes.

8. A system as in claim 1, further comprising at least one light beam in the mechanical gate, wherein the at least one light beam must be tripped, the mobile phone token device must contain at least two valid tickets and the system computing device must determine the shared proximity of the mobile phone token device to be within a predetermined area for mechanical gate to go to the open position.

9. A system as in claim 8, wherein the mechanical gate goes to a closed position a predetermined length of time after the at least one light beam is tripped a number of times that corresponds to the number of the at least two valid tickets.

10. The system as in claim 1, further comprising an additional ticket validation, wherein there must be the additional ticket validation, the mobile phone token device must contain a valid ticket and the system computing device must determine the shared proximity of the mobile phone token device to be within a predetermined area for mechanical gate to go to the open position.

11. The system as in claim 10, wherein the additional ticket validation is selected from the group consisting of visual validation, fingerprint scanning, sound sampling, facial recognition, a light beam, Bluetooth LE, wireless proximity analysis, GPS, geo-fencing, automated license plate reading, fingerprint scanning, facial recognition, unique alphanumeric ID entry via a keyboard, numeric keypad.

12. A system as in claim 8, wherein the shared proximity of the mobile phone token device is determined according to one detection data point in the set of detection data points and the at least one light beam.

13. A system as in claim 1, wherein the mobile phone token device is determined to contain a valid ticket by having a stored ticket token that is transmitted to the system computing device.

14. A system as in claim 13, wherein the stored ticket token is transmitted to the system computing device over a secure data channel.

15. A system as in claim 13, wherein the stored ticket token is generated by the system computing device using at least one of the token device IMEI (international mobile equipment identity) number, token device UDID (unique device identifier) and the token device serial number.

16. A system as in claim 1, further comprising an activated ticket indicator for each of the at least two valid tickets that activated.

17. A system as in claim 1, further comprising a secure data channel between the mobile phone token device and the computing device, wherein the computing device determines that the mobile phone token device contains at least two valid tickets or does not contain a valid ticket by fetching at least one stored ticket token on the mobile phone token device and transmitting the at least one stored ticket token from the mobile phone token device to the computing device over the secure data channel.

18. A system as in claim 1, further comprising a ticketing verification system in communication with the mobile phone token device, wherein the ticketing verification system provides the mobile phone token device with at least two valid tickets and wherein the system computing device determines that the mobile phone token device contains at least two valid tickets from the ticketing verification system to cause the mechanical gate to go to the open position to allow entry for a number of persons corresponding to the number of at least two valid tickets.

19. A system for monitoring permission for at least two persons to be in a location, said system comprising:
  a secured area having at least one entry point, wherein each of the entry points have an access allowed indication or an access denied indication;
  at least two Bluetooth low energy wireless proximity devices, wherein at least one Bluetooth low energy wireless proximity detection device is in at least one of a portion of the entry point and an area adjacent to the entry point;
  a mobile phone token device in communication with the at least two Bluetooth low energy wireless proximity detection device and a system computing device in communication with the at least two Bluetooth low energy wireless proximity detection devices, wherein each of the at least two wireless proximity detection devices are used by the system computing device to determine a relative location of the mobile phone token device relative to at least one of the at least two Bluetooth low energy wireless proximity detection devices according to signal strength to provide a detection data point for each of the at least two Bluetooth low energy wireless proximity detection devices and a set of detection data points for the group of detection data points;
  wherein the system computing device calculates the shared proximity of the mobile phone token device according to the set of detection data points and determines that the mobile phone token device contains at least two valid tickets or does not contain a valid ticket, wherein the mobile phone token device contains at least two valid tickets and the system computing device determines the shared proximity of the mobile phone token device is within a predetermined area the system computing device will cause the access allowed indication to display to allow entry for a number of persons corresponding to the number of the at least two valid tickets.

20. A system as in claim 19, wherein the at least two wireless proximity detection devices are selected from the group consisting of Bluetooth sensors, Bluetooth LE sensors, antennas, Global Positioning Systems (GPS), cellular data, WiFi, cell signal detection, radio frequency sensors, cell signal detection on LTE, LTE Advanced and cell signal detection on GSM.

21. A system as in claim 19, wherein the system computing device causes the access denied indication to display upon determining that the shared proximity of the mobile phone token device is outside a predetermined area.

22. A system as in claim 19, wherein the system computing device calculates the shared proximity of the mobile phone token device according to triangulation of the set of detection data points.

23. A system as in claim 19, wherein the system computing device calculates the shared proximity of the mobile phone token device according to geometric calculations of the set of detection data points.

24. A system as in claim 19, wherein the system computing device calculates the shared proximity of the mobile phone token device according to a sensor sensitivity profile.

25. A system as in claim 19, wherein the system computing device calculates the shared proximity of the mobile phone token device according to a sensor sensitivity profile that has a predetermined range of shapes from a signal of a predetermined set of strengths at each of the at least two wireless proximity detection devices and determines that the shared proximity of the mobile phone token device is within the predetermined area to cause the access allowed indication to display only when the sensor sensitivity profile is in the predetermined range of shapes.

26. A system as in claim 19, further comprising at least one light beam substantially in or adjacent to the at least one entry point, wherein the at least one light beam must be tripped, the mobile phone token device must contain at least two valid tickets and the system computing device must determine the shared proximity of the mobile phone token device to be within a predetermined area for the access allowed indication to display.

27. A system as in claim 26, wherein the access denied indication is displayed a predetermined length of time after the at least one light beam is tripped a number of times that corresponds to the number of the at least two valid tickets.

28. The system as in claim 19, further comprising an additional ticket validation, wherein there must be the additional ticket validation, the mobile phone token device must contain a valid ticket and the system computing device must determine the shared proximity of the mobile phone token device to be within a predetermined area for the access allowed indication to display.

29. The system as in claim 28, wherein the additional ticket validation is selected from the group consisting of visual validation, fingerprint scanning, sound sampling, facial recognition, a light beam, Bluetooth LE, wireless proximity analysis, GPS, geo-fencing, automated license plate reading, fingerprint scanning, facial recognition, unique alphanumeric ID entry via a keyboard, numeric keypad.

30. A system as in claim 19, wherein the shared proximity of the mobile phone token device is determined according to one detection data point in the set of detection data points and the at least one light beam.

31. A system as in claim 19, wherein the mobile phone token device is determined to contain a valid ticket by having a stored ticket token that is transmitted to the system computing device.

32. A system as in claim 31, wherein the stored ticket token is transmitted to the system computing device over a secure data channel.

33. A system as in claim 31, wherein the stored ticket token is generated by the system computing device using at least one of the token device IMEI (international mobile equipment identity) number, token device UDID (unique device identifier) and the token device serial number.

34. A system as in claim 19, further comprising an activated ticket indicator for each of the at least two valid tickets that activated.

35. A system as in claim 19, further comprising a secure data channel between the mobile phone token device and the computing device, wherein the computing device determines that the mobile phone token device contains at least two valid tickets or does not contain a valid ticket by fetching at least one stored ticket token on the mobile phone token device and transmitting the at least one stored ticket token from the mobile phone token device to the computing device over the secure data channel.

* * * * *